United States Patent
Choudhury et al.

(10) Patent No.: US 10,810,210 B2
(45) Date of Patent: Oct. 20, 2020

(54) PERFORMANCE AND USABILITY ENHANCEMENTS FOR CONTINUOUS SUBGRAPH MATCHING QUERIES ON GRAPH-STRUCTURED DATA

(71) Applicant: Battelle Memorial Institute, Richland, WA (US)

(72) Inventors: Sutanay Choudhury, Kennewick, WA (US); George Chin, Jr., Richland, WA (US); Khushbu Agarwal, Kennewick, WA (US); Sherman J. Beus, Benton City, WA (US)

(73) Assignee: Battelle Memorial Institute, Richland, WA (US)

( * ) Notice: Subject to any disclaimer, the term of this patent is extended or adjusted under 35 U.S.C. 154(b) by 278 days.

(21) Appl. No.: 15/594,376

(22) Filed: May 12, 2017

(65) Prior Publication Data
US 2018/0329958 A1 Nov. 15, 2018

(51) Int. Cl.
*G06F 16/2455* (2019.01)
*G06F 16/23* (2019.01)
(Continued)

(52) U.S. Cl.
CPC .... *G06F 16/24568* (2019.01); *G06F 16/2343* (2019.01); *G06F 16/2379* (2019.01);
(Continued)

(58) Field of Classification Search
CPC .......... G06F 16/24568; G06F 16/9024; G06F 16/9032; G06F 21/552; G06F 16/2343; G06F 16/2379; G06F 16/2456
See application file for complete search history.

(56) References Cited

U.S. PATENT DOCUMENTS 7,013,395 B1 * 3/2006 Swiler ................. H04L 63/1433
713/151
7,383,253 B1 6/2008 Tsimelzon et al.
(Continued)

OTHER PUBLICATIONS

Choudhury, "Subgraph Search for Dynamic Graphs", Dissertation for Washington State University, retrieved from https://research.libraries.wsu.edu/xmlui/handle/2376/5114, Published 2014 (Year: 2014).*

(Continued)

*Primary Examiner* — David T. Brooks
(74) *Attorney, Agent, or Firm* — Klarquist Sparkman, LLP

(57) ABSTRACT

A query graph, which includes vertices and edges, represents a query on graph-structured data. The query graph is decomposed into query subgraphs. A network analysis tool performs continuous subgraph matching queries to facilitate analysis of computer network traffic, social media events, or other streams of data represented as a dynamic data graph (graph-structured data). This can help identify emerging trends in the data. Some features of the network analysis tool enhance performance by effectively utilizing distributed computing resources (including processing cores and memory at different nodes of a cluster) to speed up the process of updating the dynamic data graph and detecting matches of query subgraphs. Features of a query graph building tool enhance usability by providing intuitive ways to specify query graphs and their subgraphs. Features of a results visualization tool enhance usability by providing an intuitive way to present the results of continuous subgraph matching queries.

37 Claims, 14 Drawing Sheets

(51) Int. Cl.
*G06F 16/901* (2019.01)
*G06F 21/55* (2013.01)

(52) U.S. Cl.
CPC ...... *G06F 16/2456* (2019.01); *G06F 16/9024* (2019.01); *G06F 21/552* (2013.01)

(56) References Cited

U.S. PATENT DOCUMENTS

| | | | |
|---|---|---|---|
| 7,933,915 B2 | 4/2011 | Singh et al. | |
| 8,533,182 B1* | 9/2013 | Charboneau | G06F 16/90335 707/718 |
| 2001/0055017 A1* | 12/2001 | Ording | 345/440 |
| 2007/0209074 A1* | 9/2007 | Coffman | H04L 63/145 726/23 |
| 2007/0294217 A1 | 12/2007 | Chen et al. | |
| 2009/0228434 A1 | 9/2009 | Krishnamurthy et al. | |
| 2010/0017379 A1 | 1/2010 | Naibo et al. | |
| 2010/0036831 A1 | 2/2010 | Vemuri et al. | |
| 2011/0119245 A1 | 5/2011 | Sargeant et al. | |
| 2011/0314019 A1 | 12/2011 | Jimenez Peris et al. | |
| 2013/0218899 A1 | 8/2013 | Raghavan et al. | |
| 2013/0297632 A1* | 11/2013 | Cohen | G06F 16/9024 707/758 |
| 2014/0074888 A1* | 3/2014 | Potter | G06F 16/2428 707/779 |
| 2014/0136555 A1* | 5/2014 | Jacob | G06F 16/9535 707/754 |
| 2016/0125094 A1* | 5/2016 | Li | G06F 16/9024 707/741 |
| 2016/0125300 A1* | 5/2016 | Patil | G06Q 30/02 706/11 |
| 2017/0169133 A1* | 6/2017 | Kim | G06F 16/9024 |
| 2017/0308045 A1* | 10/2017 | Dibowski | G05B 19/042 |
| 2017/0351406 A1* | 12/2017 | Rossi | G06F 3/033 |
| 2018/0039710 A1* | 2/2018 | Chen | G06F 16/24568 |
| 2018/0121482 A1* | 5/2018 | Heen | G06F 16/24568 |
| 2018/0137667 A1* | 5/2018 | Kindelsberger | G06F 3/0482 |

OTHER PUBLICATIONS

Chin et al., "StreamWorks—A System for Real-Time Graph Pattern Matching on Network Traffic" Slides Published Jan. 2015 (Year: 2015).*
Youtube Vide of Chin FlowCon Presentation, "StreamWorks—A System for Real-Time Graph Pattern Matching on Network Traffic" Published Aug. 2015 at https://www.youtube.com/watch?v=7sq14qRhlcs (Year: 2015).*
Ediger et al., "STINGER: High Performance Data Structure for Streaming Graphs" IEEE, 2012. (Year: 2012).*
Fan et al., "Incremental Graph Pattern Matching", ACM Transactions on Database Systems, Aug. 2013. (Year: 2013).*
Gao et al., "Toward continuous pattern detection over evolving large graph with snapshot isolation", VLDB Journal 2016 (Year: 2016).*
Mondal et al., "CASQDL Continuous Detection of Activity-based Subgraph Pattern Queries on Dynamic Graphs" DEBS 2015 (Year: 2016).*
Song et al., "Event Pattern Matching over Graph Streams", VLDB Journal 2015 (Year: 2015).*
Abadi et al., "Aurora: A New Model and Architecture for Data Stream Management," *VLDB Journal*, vol. 12, pp. 120-139 (Aug. 2003).
Afrati et al., "Optimizing Joins in a Map-Reduce Environment," *Int'l conf. on Extending Database Technology*, pp. 99-110 (2010).
Aspnes et al., "Skip Graphs," *ACM Trans. on Algorithms*, vol. 3, No. 4, pp. (2007).
Bader et al., "STINGER: Spatio-Temporal Interaction Networks and Graphs (STING) Extensible Representation," *Georgia Institute of Technology Tech. Rep.*, 7 pp. (May 2009).
Barbieri et al., "C-SPARQL: A Continuous Query Language for RDF Data Streams," *Int'l J. Semantic Computing*, vol. 4, No. 1, 23 pp. (2010).
Bastian et al., "Gephi: An Open Source Software for Exploring and Manipulating Networks," 2 pp. (2009).
Chen et al., "Continuous Subgraph Pattern Search Over Certain and Uncertain Graph Streams," *IEEE Trans. on Knowledge and Data Engineering*, vol. 22, No. 8, pp. 1093-1109 (Aug. 2010).
Chen et al., "NiagaraCQ: A Scalable Continuous Query System for Internet Databases," *Int'l Conf. on Management of Data*, pp. 379-390 (2000).
Chin et al., "Predicting and Detecting Emerging Cyberattack Patterns Using StreamWorks," *Cyber and Information Security Research Conf.*, pp. 93-96 (Apr. 2014).
Chondhury et al., "A Selectivity Based Approach to Continuous Pattern Detection in Streaming Graphs," *Int'l Conf. on Extending Database Technology*, 12 pp. (Mar. 2015).
Choudhury et al., "Fast Search for Multi-Relational Graphs," *Proc. of the Workshop on Dynamic Networks Management and Mining*. 8 pp. (Jun. 2013).
Choudhury et al., "StreamWorks—A System for Dynamic Graph Search," *ACM*, 4 pp. (Jun. 2013).
Conte et al., "Thirty Years of Graph Matching in Pattern Recognition," *Int'l Journal of Pattern Recognition and Artificial Intelligence*, vol. 18, No. 3, pp. 265-298 (2004).
Cordella et al., "A (Sub) Graph Isomorphism Algorithm for Matching Large Graphs," *IEEE Trans. on Pattern Analysis and Machine Intelligence*, vol. 26, No. 10, pp. 1367-1372 (2004).
Cormen et al., *Introduction to Algorithms*, vol. 2, pp. 1-40 and 704-724 (2001).
Fan et al., "Incremental Graph Pattern Matching," *SIGMOD*, 12 pp. (2011).
Ganguly et al., "Streaming Algorithms for Robust, Real-Time Detection of DDoS Attacks," *Int'l Conf. on Distributed Computing Systems*, 4 pp. (2007).
Gao et al., "Continuous Pattern Detection Over Billion-Edge Graph Using Distributed Framework," *IEEE Int'l Conf. on Data Engineering*, pp. 556-567 (2014).
Gephi, "The Open Graph Viz Platform," downloaded from the World Wide Web, 2 pp. (downloaded on May 12, 2017).
Godiyal et al., "Enhancing Network Traffic Visualization by Graph Pattern Analysis," 8 pp. (Jan. 2010).
He et al., "Closure-Tree: An Index Structure for Graph Queries," *ICDE*, 12 pp. (2006).
Hellerstein et al., "Predicate Migration: Optimizing Queries with Expensive Predicates," vol. 22, 10 pp. (1993).
Jha et al., "A Space Efficient Streaming Algorithm for Triangle Counting Using the Birthday Paradox," *SIGKDD*, 9 pp. (Aug. 2013).
Joslyn et al., "Massive Scale Cyber Traffic Analysis: a Driver for Graph Database Research," *Int'l Workshop on Graph Data Management Experience and Systems*, 6 pp. (Jun. 2013).
Karloff et al., "A Model of Computation for Mapreduce," *ACM-SIAM Symp. on Discrete Algorithms*, pp. 938-948 (2010).
Khan et al., "Neighborhood Based Fast Graph Search in Large Networks," *SIGMOD*, 12 pp. (2011).
Mondal et al., "Managing Large Dynamic Graphs Efficiently," *ACM Int'l Conf. on Management of Data*.
Mondal et al., "EAGr: Supporting Continuous Ego-Centric Aggregate Queries over Large Dynamic Graphs," *SIGMOD*, 18 pp. (Apr. 2014).
Morari et al., "Accelerating Semantic Graph Databases on Commodity Clusters," *IEEE Int'l Conf. on Big Data*, pp. 768-772 (Oct. 2013).
Morari et al., "Scaling Irregular Applications Through Data Aggregation and Software Multithreading," *IEEE Int'l Parallel & Distributed Processing Symp.*, pp. 1126-1135 (May 2014).
Morari et al., "Scaling Semantic Graph Databases in Size and Performance," *IEEE Micro Special Issue on Bit Data*, vol. 34. No. 4, pp. 16-26 (Jul. 2014).
Pugh, "Skip Lists: A Probabilistic Alternative to Balanced Trees," *Communications of the ACM*, vol. 33, No. 6, pp. 668-676 (1990).
Stanton et al., "Streaming Graph Partitioning for Large Distributed Graphs," *ACM Int'l Conf. on Knowledge Discovery and Data Mining*, pp. 1222-1230 (2012).

(56) References Cited

OTHER PUBLICATIONS

Stanford-Chen et al., "GrIDS—a Graph Based Intrusion Detection System for Large Networks," *National Information Systems Security Conf.*, 10 pp. (1996).
Sun et al., "Efficient Subgraph Matching on Billion Node Graphs," *Proc. of the VLDB Endowment*, vol. 5, No. 9, pp. 788-799 (May 2012).
Suri et al. "Counting Triangles and the Curse of the Last Reducer," *Int'l World Wide Web Conf.*, 8 pp. (Mar. 2011).
Tian et al., "TALE: A Tool for Approximate Large Graph Matching," *ICDE*, pp. 963-972 (2008).
Tong et al., "Fast Best-Effort Pattern Matching in Large Attributed Graphs," *KDD*, 10 pp. (2007).
Tsourakakis et al., "DOULION: Counting Triangles in Massive Graphs with a Coin," *SIGKDD*, 9 pp. (2009).
Ullmann, "An Algorithm for Subgraph Isomorphism," *J. ACM*, vol. 23, pp. 31-42 (Jan. 1976).
Venkataraman et al., "New Streaming Algorithms for Fast Detection of Superspreaders," *Symp. on Network and Distributed System Security*, pp. 21-30 (2005).
Wu et al., "Structural Join Order Selection for XML Query Optimization," *Int'l Conf. on Data Engineering*, pp. 443-454 (2003).
Yelick et al., "Productivity and Performance Using Partitioned Global Address Space Languages," *Proc. of the Int'l Workshop on Parallel Symbolic Computation*, pp. 24-32 (Jul. 2007).
Zhao et al., "gSketch: On Query Estimation in Graph Streams," *PVLDB*, vol. 5, No. 3, 12 pp. (2011).
Zhao et al., "On Graph Query Optimization in Large Networks," *PVLDB*, vol. 3, pp. 340-351 (Sep. 2010).
Chandrasekaran et al., "TelegraphCQ: Continuous Dataflow Processing," *SIGMOD*, pp. 668 (2003).
Chen et al., "Toward a Query Language for Network Attack Data," *Proc. Intl. Workshop on Networking Meets Databases (NetDB)*, IEEE Computer Society, pp. 28-35 (2006).
Choudhury et al., "Continuous Queries for Multi-Relational Graphs," PNNL-SA-90326, pp. 1-13 (2012).
Feo et al., "Eldorado," *Proc. Conf. on Computing Frontiers*, pp. 28-34 (2005).
Han et al., "Turbo$_{ISO}$: Towards Ultrafast and Robust Subgraph Isomorphism Search in Large Graph Databases," *SIGMOD*, pp. 337-348 (2013).
Krishnamurthy et al., "Optimization of Nonrecursive Queries," *VLDB*, vol. 86, pp. 128-137 (1986).
Lieberman et al., "Parasol: An Architecture for Cross-cloud Federated Graph Querying," *Proc. DanaC: Workshop on Data Analytics in the Cloud*, 4 pp. (2014).
Reiss et al., "Enabling Real-Time Querying of Live and Historical Stream Data," *Proc. 19th Int'l Conf. on Scientific and Statistical Database Management (SSDBM)*, IEEE Computer Society, pp. 28-37 (2007).

\* cited by examiner software 180 implementing innovations for performance and usability enhancements for continuous subgraph matching query processing on graph-structured data

FIG. 5a    501

| DYNAMIC-GRAPH-SEARCH($G_d$, T, edges) |
|---|
| 1: *leaf-nodes* =GET-LEAF-NODES(T) |
| 2: for all $e_s \in edges$ do |
| 3:   UPDATE-GRAPH($G_d, e_s$) |
| 4:   for all $n \in leaf\text{-}nodes$ do |
| 5:     $g^q_{sub}$ =GET-QUERY-SUBGRAPH(T, n) |
| 6:     *matches* =SUBGRAPH-ISO($G_d, g^q_{sub}, e_s$) |
| 7:     if *matches* $\neq \emptyset$ then |
| 8:       for all $m \in matches$ do |
| 9:         UPDATE-SJ-TREE(T, n, m) |

FIG. 5b    502

| UPDATE-SJ-TREE(*node, m*) |
|---|
| 1: *sibling* = sibling[*node*] |
| 2: *parent* = parent[*node*] |
| 3: k =GET-JOIN-KEY(CUT-SUBGRAPH[*parent*], m) |
| 4: $H_s$ = match-tables[*sibling*] |
| 5: $M^k_s$ = GET($H_s, k$) |
| 6: for all $m_s \in M^k_s$ do |
| 7:   $m_{sup}$ = JOIN($m_s, m$) |
| 8:   if parent = root then |
| 9:     PRINT('MATCH FOUND : ', $m_{sup}$) |
| 10:  else |
| 11:    UPDATE-SJ-TREE(*parent, $m_{sup}$*) |
| 12: ADD(match-tables[*node*], k, m) |

FIG. 8a        801

PARALLEL-SJ-TREE-UPDATE($T_{sj}, \Delta$)

1: $N_q$ = NUM-LEAVES($T_{sj}$)
2: for all $i \in range(1, N_q)$ do
3:   $n_{left} = 2(i - 1)$
4:   $n_{right} = 2i$
5:   if $n_{left}$ = ROOT($T_{sj}$) then
6:     REPORT-FULL-MATCH($\delta_{left}$)
7:     return
8:   $M_{left}$ = GET-MATCH-TABLE($T_{sj}, n_{left}$)
9:   $M_{right}$ = GET-MATCH-TABLE($T_{sj}, n_{right}$)
10:  if $i = 1$ then
11:    $\delta_{left} = \Delta[0]$
12:  $\delta_{right} = \Delta[i]$
13:  $M'_{left} = M_{left} \cup \delta_{left}$
14:  $M'_{right} = M_{right} \cup \delta_{right}$
15:  SET-MATCH-TABLE($T_{sj}, n_{left}, M'_{left}$)
16:  SET-MATCH-TABLE($T_{sj}, n_{right}, M'_{right}$)
17:  $\delta_{left} = (M'_{left} \bowtie \delta_{right}) \cup \delta_{left} \bowtie M'_{right}$

FIG. 8b        802

PARALLEL-HASH-JOIN($M_1, M_2, M_{out}$)

1: H = INIT-KEY-VAL-COLLECTION()
2: for all $m \in M_1$ parallel do
3:   INSERT(H, $hash$(JOIN-PRED($m$)), TUPLE($m, true$))
4: for all $m \in M_2$ parallel do
5:   INSERT(H, $hash$(JOIN-PRED($m$)), TUPLE($m, false$))
6: GROUP-BY(H, $groups$)
7: for all $g \in groups$ do
8:   $tuples$ = GET-RANGE(H, $g$)
9:   $L_1 = \emptyset$
10:  $L_2 = \emptyset$
11:  for all $t \in tuples$ do
12:    if $t(1) = true$ then
13:      $append(L_1, t)$
14:    else
15:      $append(L_2, t)$
16:  for all $m_l \in L_1$ do
17:    for all $m_r \in L_2$ do
18:      $success$ = JOIN($m_l, m_r, m_{out}$)
19:      if $success = true$ then
20:        INSERT($M_{out}, m_{out}$)

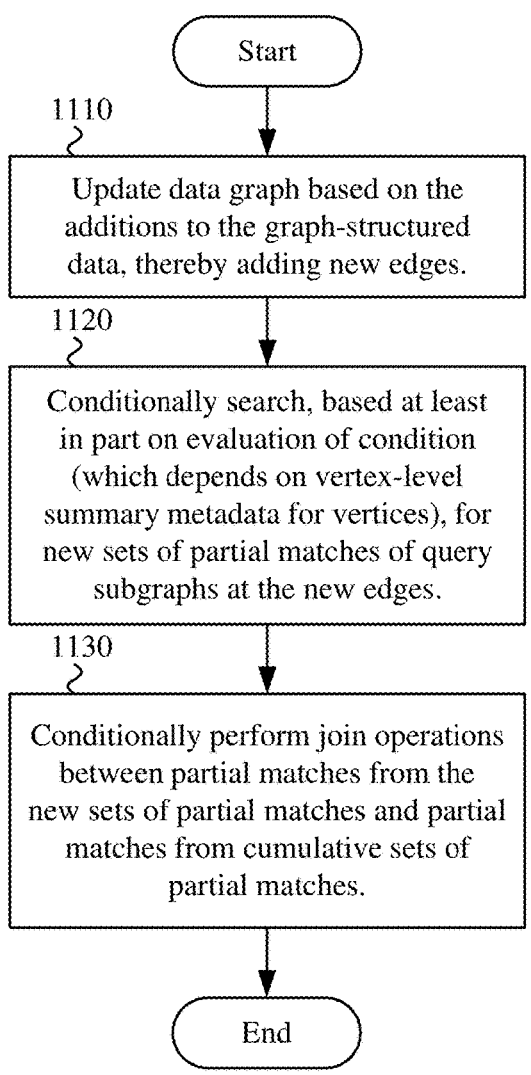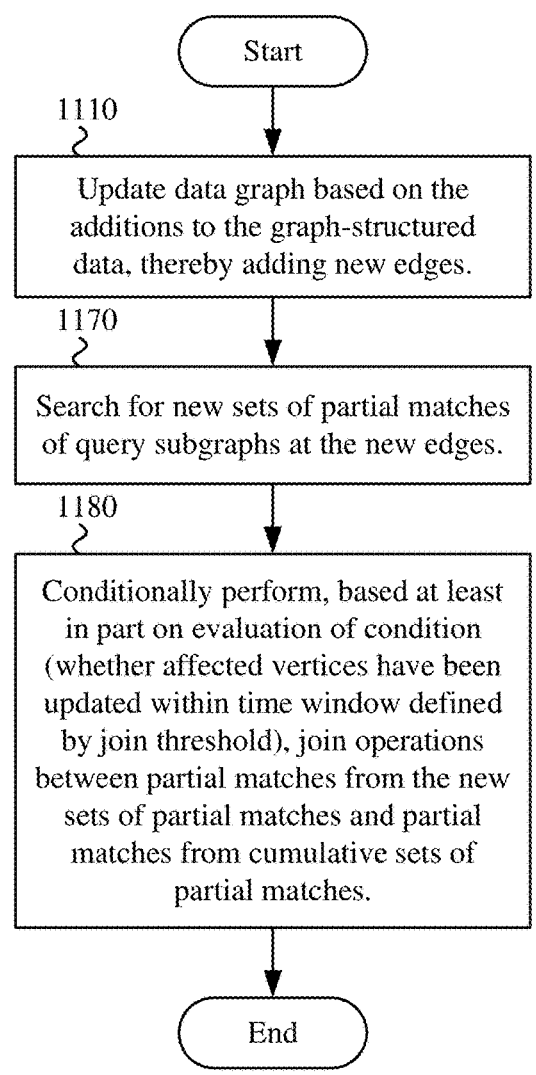

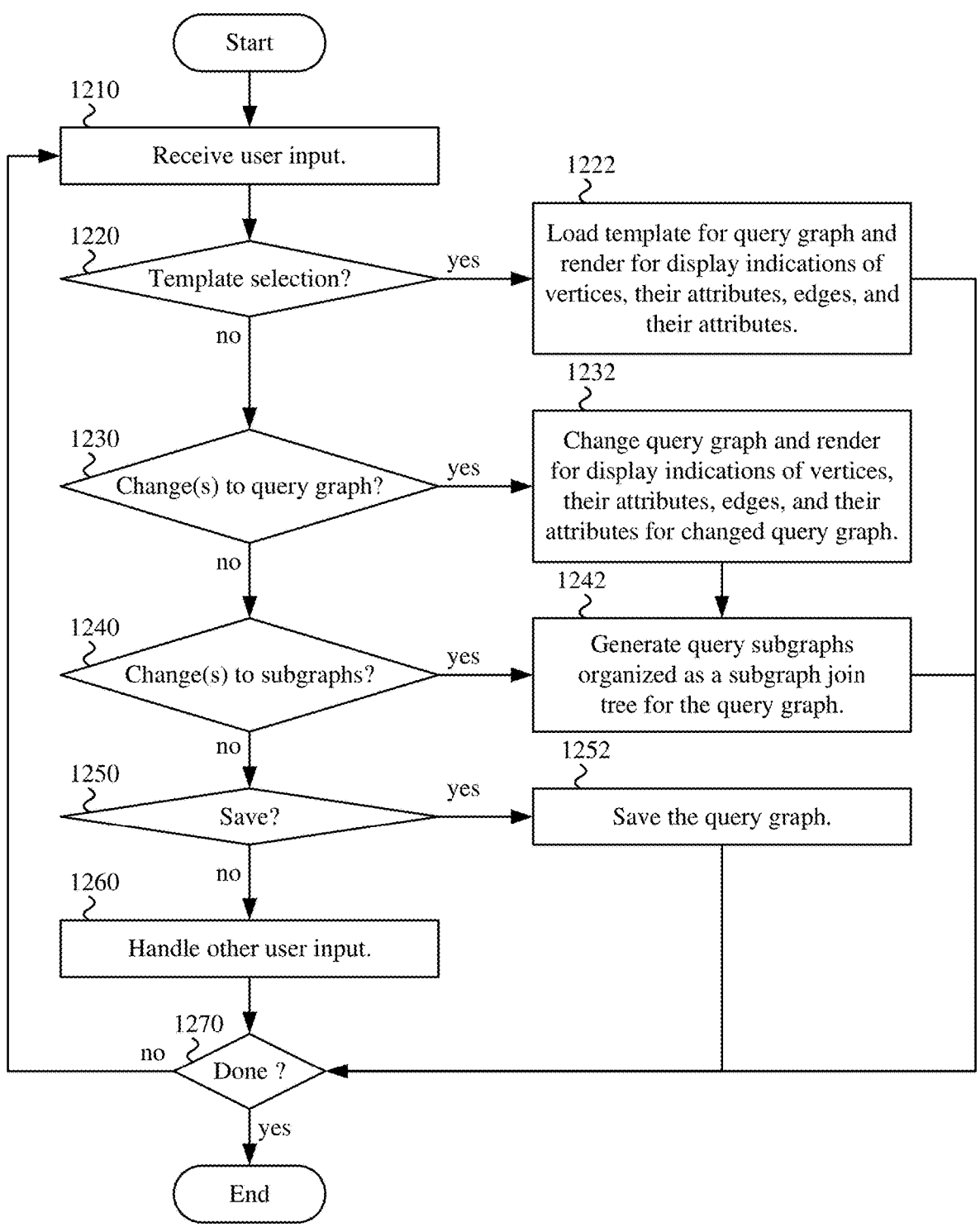

PERFORMANCE AND USABILITY ENHANCEMENTS FOR CONTINUOUS SUBGRAPH MATCHING QUERIES ON GRAPH-STRUCTURED DATA

STATEMENT AS TO RIGHTS TO INVENTIONS MADE UNDER FEDERALLY-SPONSORED RESEARCH AND DEVELOPMENT

This invention was made with government support under Contract DE-AC0576RL01830 awarded by the U.S. Department of Energy. The government has certain rights in the invention.

BACKGROUND

The number and sophistication of cyber attacks on governments, private-sector companies, and individuals have grown dramatically in recent years. To counter these alarming trends, computer security personnel may attempt to detect cyber attacks in their early stages, so that defensive actions may be taken to avert, or at least mitigate, damage or loss.

The problem of detecting cyber attacks can be viewed as a problem of identifying warning patterns in computer network traffic. A warning pattern can be modeled as a directed graph (query graph) in which vertices represents machines, Internet Protocol ("IP") addresses or other network entities, and edges represent messages, communications, etc. between the network entities. A query graph can convey how an attack, intrusion, etc. propagates through the computers of a network. To detect the cyber attack associated with the query graph, a computer system can search for instances of the query graph (that is, search for matches) within a larger graph (data graph) that represents computer network traffic. This process is an example of a "subgraph matching query" (or, for brevity, simply "subgraph matching"). In the data graph, vertices can represent actual instances of machines, IP addresses, or other network entities, and edges can represent monitored messages, communications, etc. between the network entities.

A variety of challenges exist in employing query graphs to detect cyber attacks, which has limited their practical utility. First and foremost, identifying matches of a query graph within a data graph can be quite demanding in terms of computing resources. A typical data graph may include millions (or even billions) of edges, and finding the query graph can be a time-consuming, memory-intensive process. In addition, in many use case scenarios, the goal is to find matches of a query graph in a timely manner, even as the data graph changes dynamically with streaming updates to include new edges (and even vertices). Further, patterns of communication and the status of machines in the network may change over time. Both long-term trends and recent trends are important to detect. To identify long-term trends and recent trends, a data graph can be maintained over a long time window while, on a continuous basis, new edges are added to the windowed representation and old edges are removed from the windowed representation. Another challenge is identifying partial matches of a query graph in a dynamic data graph, such that a nascent cyber attack may be detected before a complete instance of the query graph appears in the data graph. To this end, a query graph can be decomposed into multiple query subgraphs, which represent portions of the query graph. A computer system can search for instances of query subgraphs within a data graph. In addition to the same challenges of providing timely results for large, dynamic data graphs, subgraph matching query processing presents additional challenges to track partial matches and combine intermediate results.

Outside the context of network security, a query graph can model a pattern of interest in a data graph that represents social media relationships, links between documents, or another dynamically-changing set of data. For many use cases scenarios, the dynamic nature of the data graph and timing requirements present challenges to effective detection of matches of the query graph and its subgraphs.

SUMMARY

In summary, the detailed description presents various innovative features of a network analysis tool, a query graph building tool, and a results visualization tool. The network analysis tool performs continuous subgraph matching queries to facilitate analysis of computer network traffic, social media events, or other streams of data represented as graph-structured data, in order to identify emerging trends in the data. Some of the innovative features of the network analysis tool enhance performance by effectively utilizing distributed computing resources (including processing cores and memory at different nodes of a cluster of nodes) to speed up the process of updating a dynamic data graph and detecting matches of query subgraphs. Some innovative features of the query graph building tool enhance usability by providing intuitive user interface features for specifying query graphs and their subgraphs. Some innovative features of the results visualization tool enhance usability by providing an intuitive way to present the results of continuous subgraph matching queries.

For dynamic data sets, continuous execution of queries can be more efficient than periodic execution of queries. For example, a query may seek to find an attack pattern that manifests itself over a period of 24 hours. Suppose updates for a data graph (e.g., new edges) arrive every fifteen minutes. For periodic execution of the query, a 24-hour, windowed representation is constructed for the data graph, and the query is completely re-executed over the newly constructed, windowed representation every 15 minutes. Continuous queries can mitigate the inherent redundancy and inefficiency of such periodic queries. For a continuous query (e.g., a continuous subgraph matching query), a network analysis tool can perform incremental processing in which only the newest updates to a dynamic graph (e.g., over the last 15 minutes in the preceding example) and a limited amount other relevant data (e.g., for vertices/edges proximate the newest updates in a 24-hour window, in the preceding example) are processed to find updated results of the query.

According to one aspect of the innovations described herein, a computer system that implements a network analysis tool includes multiple nodes, with each of the nodes including multiple processing cores as well as memory addressed according to a global address space. The nodes are, collectively, configured to perform various operations for the network analysis tool. The network analysis tool receives, as part of one or more streams of updates, information that indicates additions to a data graph (graph-structured data). The data graph includes vertices and edges between the vertices. The network analysis tool performs a continuous query process to identify complete matches, if any, of a query graph within the data graph. The continuous query process uses multithreading with tasks executable in parallel on at least some of the processing cores of the nodes. Examples of operations performed as part of the continuous query process are described below. Finally, the network analysis tool outputs results of the continuous query process (e.g., indications of complete matches, if any, of the query graph within the data graph and/or new sets of partial matches).

For example, the continuous query process can include operations to (1) update the data graph based on additions to the data graph, thereby adding new edges to the edges of the data graph; (2) search for new sets of partial matches of query subgraphs of the query graph at the new edges of the data graph; and (3) conditionally perform, based at least in part on evaluation of a condition, join operations between (a) partial matches from the new sets of partial matches and (b) partial matches from cumulative sets of partial matches. The condition can be whether affected vertices of the data graph for the partial matches from the cumulative sets of partial matches have been updated within a time window defined by a join threshold. In this way, the continuous query process can limit join operations to active vertices (that is, those within the time window defined by the join threshold), which are more likely to lead to complete matches of the query graph (or at least more complete partial matches). For example, for a given partial match from one of the cumulative sets of partial matches, for the evaluation of the condition, the network analysis tool determines whether the affected vertices for the given partial match have been updated within the time window defined by the join threshold. If so, the network analysis tool performs one of the join operations between the given partial match (from one of the cumulative sets) and a partial match from one of the new sets of partial matches. Otherwise, the network analysis tool skips the performing one of the join operations between the given partial match (from one of the cumulative sets) and the partial match from one of the new sets of partial matches. For the evaluation of the condition, the affected vertices for the given partial match can be all vertices of the given partial match or a subset of vertices of the given partial match.

As another example, the continuous query process can include operations to (1) update the data graph based on additions to the data graph, thereby adding new edges to the edges of the data graph; (2) conditionally search, based at least in part on evaluation of a condition, for new sets of partial matches of query subgraphs of the query graph at the new edges of the data graph; and (3) conditionally perform join operations between partial matches from the new sets of partial matches and partial matches from cumulative sets of partial matches. For the conditional searching, the condition can depend on vertex-level summary metadata for at least some of the vertices of the data graph. The vertex-level summary metadata can include various types of information, which can permit the network analysis tool to selectively perform search operations. For example, the vertex-level summary metadata can include indicators of temporal activity, in which case, for a given one of the new edges of the data graph, the conditional searching can depend on whether corresponding indicators (for affected vertices directly connected to the given new edge) indicate at least a threshold level of activity at the vertices connected to the given new edge. As another example, the vertex-level summary metadata can include indicators of range of relations, in which case, for a given one of the new edges of the data graph, the conditional searching can depend on whether corresponding indicators (for affected vertices directly connected to the given new edge) indicate at least a threshold range of relations for the vertices connected to the given new edge. As another example, the vertex-level summary metadata can include indicators of updates within a time window defined by a search threshold, in which case, for a given one of the new edges of the data graph, the conditional searching can depend on whether corresponding indicators (for affected vertices directly connected to the given new edge) indicate activity within the time window at the vertices connected to the given new edge.

The continuous query process can also include pruning the data graph to remove one or more of the edges and/or one or more of the vertices of the data graph. For example, the network analysis tool determines which of the edges of the data graph are outside a time window defined by a pruning threshold, and the pruning removes any of the edges of the data graph that are outside the time window defined by the pruning threshold. As another example, the network analysis tool determines which of the vertices of the data graph are attached to none of the edges of the data graph, and the pruning removes any of the vertices of the data graph that are not attached to any of the edges of the data graph. In this way, old information can be "aged out" of the data graph.

When searching for partial matches, the searching can check for partial matches of each unique query subgraph (among the query subgraphs of the query graph) at the new edges of the data graph. Or, as part of a lazy searching process, the searching can check, at the new edges of the data graph, for partial matches of only a top-selectivity query subgraph and any other query subgraph, among the query subgraphs, that furthers progress of a previous partial match towards completion.

Depending on implementation, various operations of the continuous query process can be parallelized. In some example implementations, when the data graph is updated, different instances of tasks are executable in parallel for different batches of the additions to the data graph. In some example implementations, when searching for new sets of partial matches, different instances of tasks are executable in parallel for different edges of the new edges of the data graph. When conditionally performing join operations, the network analysis tool can, for a given one of the new sets of partial matches and a corresponding one of the cumulative sets of partial matches, (1) map at least some of the given new set of partial matches and at least some of the corresponding cumulative set of partial matches to a sequence of key-value pairs; (2) aggregate the key-value pairs to produce groups of the key-value pairs organized by key; and (3) reduce the respective groups of key-value pairs. In this case, in some example implementations, for the mapping, different instances of tasks are executable in parallel for different partial matches of the given new set of partial matches and the corresponding cumulative set of partial matches. Further, for the reducing, different instances of tasks are executable in parallel for different groups among the groups of the key-value pairs. Depending on implementation, the condition that is evaluated when conditionally performing join operations can be evaluated before the mapping, during the mapping, or during the reducing. In any case, the condition indicates whether the network analysis tool should attempt any join operation at all between a pair of partial matches (one from a new set, and the other from a cumulative set).

The network analysis tool can be used in various use case scenarios. For example, in the context of computer network security, the network analysis tool receives information that indicates additions to a data graph (graph-structured data) as part of one or more streams of updates from one or more network traffic monitors. In this context, the query graph represents a target pattern of intrusion or attack in a computer network, the vertices of the data graph represent network entities selected from the group consisting of machines (having IP addresses or other network addresses), services, and applications, and the edges of the data graph represent communications between the network entities. Or, in the context of social media analysis, the network analysis tool receives information that indicates additions to a data graph (graph-structured data) as part of one or more streams of updates from one or more event monitors. In this context, the query graph represents a target pattern of relationships in a social media network, the vertices of the data graph represent social media entities selected from the group consisting of users, services, and items, and the edges of the data graph represent relationships (such as friend, likes, follows, etc.) between the social media entities. Or, in the context of link analysis, the network analysis tool receives information that indicates additions to a data graph (graph-structured data) as part of one or more streams of updates from one or more link monitors. In this context, the query graph represents a target pattern of links in a set of documents (e.g., Web pages, blog posts), the vertices of the data graph represent the respective documents, and the edges of the data graph represent links between the documents. Alternatively, the network analysis tool is used in some other use case scenario.

According to another aspect of the innovations described herein, a query graph building tool simplifies the process of generating query graphs, for use in execution of continuous subgraph matching queries on graph-structured data. The query graph building tool receives user input that indicates a selection, from a library of multiple available templates, of a template for a query graph. For example, the different available templates can represent different patterns for network intrusions or other cyber attacks, different social media filters, or other target patterns. In any case, the query graph can include vertices, attributes of the vertices, edges between the vertices, and attributes of the edges for a target pattern.

In response to the user input, the query graph building tool loads the template for the query graph. The query graph building tool renders for display graphical indications of the vertices, attributes of the vertices, edges, and attributes of the edges of the query graph. A given one of the attributes of the vertices or edges of the query graph can have a wildcard value (so that it matches anything) or a specific value.

The query graph building tool receives user input that indicates one or more changes to the query graph. In response, the query graph building tool changes the query graph based on the user input. For example, the query graph building tool adds one or more new vertices, removes one or more vertices, adds one or more new edges, removes one or more edges, changes one or more attributes of vertices, and/or changes one or more of attributes of edges of the query graph. The query graph building tool saves the query graph, including the query subgraphs organized as the subgraph join ("SJ") tree.

The query graph building tool can present, on a display screen, results of searching for the query graph within a data graph. The results can indicate complete matches, if any, of the query graph as well as partial matches of one or more of the query subgraphs. After that, the query graph building tool can receive user input that indicates one or more new changes to the query graph and, in response to the user input, change the query graph.

The query graph building tool generates query subgraphs organized as an SJ tree for the query graph. The query graph building tool can receive user input that specifies which of the query subgraphs is to be searched first during a continuous query process (e.g., for lazy searching), and save, in association with the SJ tree, an indication of which of the query subgraphs is to be searched first during the continuous query process. The query graph building tool can also present, on a display screen, results of searching for the query graph within a data graph. The results can indicate complete matches, if any, of the query graph as well as partial matches of one or more of the query subgraphs. The query graph building tool can receive user input that changes which of the query subgraphs is to be searched first during the continuous query process and, based on the user input, adjust the indication of which of the query subgraphs is to be searched first during the continuous query process.

The query graph building tool can be used in various use case scenarios. For example, in the context of computer network security, the query graph represents a target pattern of intrusion or attack in a computer network, the vertices of the query graph represent network entities selected from the group consisting of machines (having IP addresses or other network addresses), services, and applications, and the edges of the query graph represent communications between the network entities. Or, as another example, in the content of social media analysis, the query graph represents a target pattern of relationships in a social media network, the vertices of the query graph represent social media entities selected from the group consisting of users, services, and items, and the edges of the query graph represent relationships between the social media entities. Or, as another example, in the context of link analysis, the query graph represents a target pattern of links in a set of documents, the vertices of the query graph represent the respective documents, and the edges of the query graph represent links between the documents. Alternatively, the query graph building tool is used in some other use case scenario.

According to another aspect of the innovations described herein, during execution of continuous subgraph matching queries on graph-structured data, a results visualization tool receives information that indicates complete matches, if any, of a query graph within the data graph. The data graph includes vertices and edges between the vertices. The query graph includes query subgraphs. The visualization tool also receives information that indicates partial matches of the query subgraphs within the data graph. The visualization tool renders for display, and presents on a display screen, a match graphic that depicts at least some of the vertices and at least some of the edges of the data graph, the complete matches (if any), and the partial matches. For the partial matches, the rendering depends on extent of progress (or maturity) towards completion. For example, for the partial matches, color in the match graphic can depend on the extent of progress towards completion. As another example, for the partial matches, the rendering can depend at least in part on selectivity of associated query subgraph. The visualization tool can repeat these operations as the data graph changes.

The visualization tool can render for display, and present on a display screen in conjunction with the match graphic, a progress graphic that depicts vertices of an SJ tree for the query graph. The rendering the progress graphic can depend at least in part on counts of matches for the vertices of the SJ tree. For example, for the vertices of the SJ tree, color and/or size in the progress graphic can depend on the counts of the matches for the vertices of the SJ tree.

The visualization tool can present the match graphic in an abstract view. Or, the visualization tool can selectively composite the match graphic over a geo-spatial map view in which the vertices of the data graph are depicted at different physical locations.

The visualization tool can be used in various use case scenarios. For example, in the context of computer network security, the query graph represents a target pattern of intrusion or attack in a computer network, the vertices of the query graph and data graph represent network entities selected from the group consisting of machines (having IP addresses or other network addresses), services, and applications, and the edges of the query graph and data graph represent communications between the network entities. Or, as another example, in the content of social media analysis, the query graph represents a target pattern of relationships in a social media network, the vertices of the query graph and data graph represent social media entities selected from the group consisting of users, services, and items, and the edges of the query graph and data graph represent relationships between the social media entities. Or, as another example, in the context of link analysis, the query graph represents a target pattern of links in a set of documents, the vertices of the query graph and data graph represent the respective documents, and the edges of the query graph and data graph represent links between the documents. Alternatively, the visualization tool is used in some other use case scenario.

The innovations can be implemented as part of a method, as part of a computing system adapted to perform the method, or as part of tangible computer-readable media storing computer-executable instructions for causing a computing system to perform the method. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIGS. 5a and 5b are pseudocode listings that illustrate example processes of dynamic graph searching and SJ tree updating in a serial implementation.

FIGS. 8a and 8b are pseudocode listings that illustrate example processes of parallel SJ tree updates and parallel hash-based join operations for execution of continuous subgraph matching queries on graph-structured data in a distributed computer system.

FIGS. 11a and 11b are flowcharts illustrating example continuous query processes during the continuous subgraph matching queries.

FIG. 12 is a flowchart illustrating a generalized technique for query graph building from a template, for use in execution of continuous subgraph matching queries on graph-structured data.

DETAILED DESCRIPTION

Figure 1:
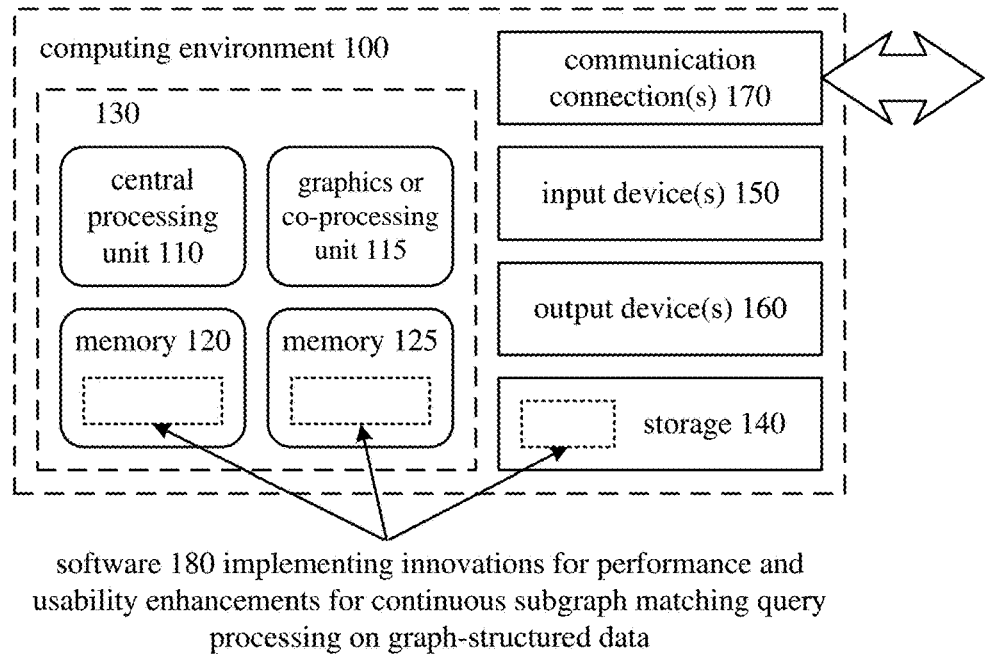
FIG. 1 is a diagram of an example computer system in which some described embodiments can be implemented.

The detailed description presents various innovative features of a network analysis tool that performs continuous subgraph matching queries. The network analysis tool facilitates monitoring and analysis of computer network traffic, social media events, or other streams of data represented as graph-structured data in order to identify emerging trends. The detailed description also presents various innovative features of a query graph building tool and results visualization tool.

In the context of computer network security, the network analysis tool can be used to identify emerging network intrusions and other threats in a computer network. Computer network data can be modeled as a dynamic data graph, with vertices representing host machines or other network entities, and edges representing messages or other communication between the network entities. Different patterns, represented as query graphs, can be defined for different types of trends in the computer network data. For example, different query graphs can be defined for specific types of cyber attacks such as network scans, reflector attacks, flood attacks, viruses, worms, etc. The network analysis tool supports query matching that considers attributes such as host names, IP addresses, transport protocols, ports, packet sizes, machine types, and message types. By some reports, up to 90% of network intrusions and attacks follow ten common attack patterns. By representing those ten common attack patterns with a small set of query graphs and searching for those query graphs in continuous subgraph matching queries, a network analysis tool can detect the vast majority of network intrusions and attacks. A sophisticated attacker may attempt to evade detection by hiding or camouflaging the source or origin of an attack, but the overall pattern of behavior can still be detected over time by the network analysis tool. Further, forcing the attacker to adapt imposes costs on the attacker.

A query graph represents a target pattern for matching in a data graph. More formally, a query graph can be modeled as a temporal, multi-dimensional, directed multi-graph. A query graph can be quite complex, potentially including many vertices and edges in repeating internal structures and/or non-repeating arrangements. If a query graph is simple, the query graph is easier for a user to understand. To be useful, however, a query graph should capture enough of the unique structure of the target pattern to identify instances of the target pattern without incorrectly flagging normal data events.

Searching for a complete match of a query graph can be a computationally-intensive process, especially for a continuous query. To reduce computational load, the network analysis tool can decompose a query graph into multiple query subgraphs, which provide smaller search patterns as constituents of the query graph. Intuitively, matches of the smaller search patterns for the query subgraphs (partial matches) signify precursor events that emerge in a data graph before a complete match of a query graph emerges.

In some example implementations, a subgraph join ("SJ") tree organizes the query subgraphs of a query graph. For example, the SJ tree is implemented as a binary tree that successively divides a query graph into two child query subgraphs. One or more specific vertices, which occur in each of the child subgraphs, provide a join point between the two child query subgraphs. The root vertex of the SJ tree represents the complete query graph, and each descending level decomposes the query graph (or a section thereof) into two child query subgraphs. Decomposition of the query graph can continue to an arbitrary number of levels. In example scenarios, decomposition is stopped when a "primitive" pattern is reached that is small enough, and discriminative enough, to be found efficiently in a data graph to signify an exact match of a query subgraph. As precursor events (partial matches) are detected in the data graph for query subgraphs of a query graph, they are associated with the corresponding vertices of the SJ tree for that query graph.

Partial matches may be joined to other, previously occurring partial matches to signify larger matches. Specifically, partial matches for sibling query subgraphs in the SJ tree may be combined to form a larger partial match (or complete match) higher in the SJ tree. For two partial matches of sibling query subgraphs to be joined, the partial matches have matching vertice(s) at their join point. The two partial matches connect at their join point to construct the larger partial match, which is stored and tracked as a new partial match in the SJ tree. The lower level sibling partial matches are retained, as they may continue to be joined in later operations as more partial matches emerge, even if the larger partial match is removed. Matches that occur higher in the SJ tree indicate a higher probability that the complete target pattern (for the query graph) is occurring. By limiting exact subgraph matching to small, discriminative patterns and using the SJ tree to incrementally grow partial matches, the network analysis tool can efficiently grow partial matches into complete matches for query graphs.

A continuous query runs continuously over time (at least logically) on a data set, even as that data set is dynamically updated. A continuous query is typically "registered" into a network analysis tool, and then executed in a data-driven fashion against a data set. That is, even if the continuous query does not, strictly speaking, execute without interruption on the data set, the continuous query is logically continuous in that it continues execution as streams of updates are added to the data set and/or old data is removed from the data set, without restarting the continuous query. In some example implementations, the data set is organized as graph-structured data.

In some example implementations, the network analysis tool performs continuous query processes that prioritize certain query subgraphs when searching a data graph. This can speed up processing, especially for a large, dynamic data graph. The network analysis tool can determine which query subgraphs to prioritize for so-called "lazy searching" based on collected statistics about the frequency of different vertices and edges of a query graph. Confidence scores can be computed for partial matches of query subgraphs represented in an SJ tree through training on a representative set of data, so as to measure frequencies of occurrence for the respective query subgraphs as precursors of complete matches for the query graph. Thus, for example, common query subgraphs that only rarely lead to a complete match can be de-prioritized for searching, and rare query subgraphs that more consistently lead to a complete match can be prioritized for searching.

The set of edges in a data graph represents communications, interactions, or relationships between entities represented by the vertices of the data graph. A data graph can represent data within a particular time window. In some example implementations, the network analysis tool considers updates to a data graph, even when those updates are "live" updates streamed at high data rates and almost in real time. In this way, batches of new vertices and edges can be added to a data graph. Concurrently, old vertices and edges can be pruned from the data graph. Thus, within a time window, the size of a dynamic data graph may grow as new vertices and edges are added, and shrink as old vertices and edges are removed. The resulting data graph can include millions, or even billions, of edges. By effectively searching for query subgraphs within the large, dynamic data graph on a continuous basis, the network analysis tool can identify target patterns (e.g., for intrusions or other threats) in a timely manner. The network analysis tool can identify new partial matches for query subgraphs, and extend previous partial matches, as the data graph grows and evolves. When a node or edge is removed from the data graph due to aging, any partial match that contains the removed node or edge is removed from the sets of partial matches in an SJ tree. Child partial matches of the removed partial match may still be present in the SJ tree, however, since they are independently retained at the lower level of the SJ tree.

In some example implementations, the network analysis tool can even track the emergence of small patterns for query subgraphs as they appear in a dynamic data graph, without previous registration of a query graph that includes the query subgraphs. In this way, the network analysis tool can identify zero-day exploits or other previously unidentified patterns. In particular, the system may be seeded with hints to look for small patterns that involve rare events (based on statistics collected in training), critical resources (such as an authentication server, domain name server, database, etc.), or specific entities (e.g., host machines) that are designated as engaging in suspicious or anomalous behavior. When seeded small patterns are found in a data graph, the small patterns can be tracked and monitored within SJ trees. Query subgraphs for small patterns can be joined based on specific criteria such as growth beyond a threshold size, incorporation of critical resources, or detection of a significant interaction or communication. Initial seeded patterns may have confidence scores that are based on collected statistics or assigned by a user. The confidence scores may propagate upward through an SJ tree, until a complete pattern for a query graph emerges.

The network analysis tool can be implemented in a distributed computer system to utilize additional resources for subgraph query matching. Various innovations for parallelized, distributed subgraph query matching are described below.

The network analysis tool can provide mechanisms for users to vet tracked patterns so as to improve analysis and performance. In particular, the network analysis tool permits users to eliminate benign patterns from being monitored and assessed.

The network analysis tool can include a query graph building tool and/or a results visualization tool. Or, the network analysis tool, query graph building tool, and visualization tool can be separate tools.

The query graph building tool provides an interactive tool for building query graphs starting from templates, for use in execution of continuous subgraph matching queries on graph-structured data. A template can provide initial pattern for a type of query graph. A user can then change the initial pattern to add or remove vertices, add or remove edges, and/or change attributes in order to adapt the initial pattern for use as a query graph. The visualization tool can present to the user results of searching for the query graph in a data graph. Based on this feedback, the user can further modify the query graph in the query graph building tool. In this way, the user can evaluate the performance of different target patterns for query graphs in detecting events of interest. Various innovations for the user interface of a query graph building tool are described below.

During the execution of continuous subgraph matching queries on graph-structured data, the results visualization tool can show emerging and evolving patterns in a dynamic data graph, along with a visualization of the SJ tree for a query graph. The depiction of the SJ tree can show statistics that indicate the level of matching for the respective query subgraphs. A matching score can be computed based on where a match occurs in the SJ tree. The matching score can quantify, for example, the count of edges in the query subgraph as a proportion of the count of edges in the query pattern. Various innovations for the user interface of a results visualization tool are described below.

In the examples described herein, identical reference numbers in different figures indicate an identical component or module. Depending on context, a given component or module may accept a different type of information as input and/or produce a different type of information as output. More generally, various alternatives to the examples described herein are possible. For example, some of the methods described herein can be altered by changing the ordering of the method acts described, by splitting, repeating, or omitting certain method acts. The various aspects of the disclosed technology can be used in combination or separately. For example, the network analysis tool can be used by itself or in combination with the query graph building tool and/or visualization tool. Different embodiments use one or more of the described innovations. Some of the innovations described herein address one or more of the problems noted in the background. Typically, a given technique/tool does not solve all such problems.

I. Use Case Scenarios

Innovations in subgraph pattern matching as described herein can be used in various use case scenarios. In general, a network analysis tool searches for one or more query graphs (including query subgraphs) in a data graph as the data graph dynamically evolves. As used herein, the term "network analysis tool" indicates an analysis tool used to analyze any type of data represented in a data graph for a network of entities, whether that data is computer network traffic, social media relationships, links between documents, or other data. The data graph includes graph-structured data (organized as vertices and edges between vertices) and is updated in response to streams of updates. In general, a stream of updates to a data graph is a time series of updates to the data graph.

In some use case scenarios, a network analysis tool performs subgraph pattern matching for network intrusion detection or other network security analysis. A data graph can represent network traffic data from a computer network. For example, a data graph can include vertices that represent host machines (having IP addresses), with edges indicating communications between the host machines. Or, a data graph can include vertices that represent services, applications, sensors, or other network entities, with edges indicating communications between such network entities. In this use case scenario, network traffic data can be provided in a IPFIX format, Netflow format, or other format as streams of updates from network traffic monitors. In addition to network traffic data from traffic monitors, streams of updates to a data graph can be provided from other types of monitors (sources), such as an event log, a host scan log, a firewall log, or anti-malware report. This potentially enriches the data graph by providing different attributes that can be used during a continuous query process. That is, in addition to attributes based on network traffic data, a query graph can include attributes based on data provided by the diverse types of monitors.

In other use case scenarios, a network analysis tool performs subgraph pattern matching for social media analysis. A data graph can represent data from a social network. For example, a data graph can include vertices that represent persons, items, services, or other entities, with edges indicating relationships (such as friend, likes, follows, etc.) between entities. Or, edges can indicate propagation (sharing) of information between entities. In this scenario, graph data can be provided as streams of updates from one or more event monitors for the social network.

In still other use case scenarios, a network analysis tool performs subgraph pattern matching for link analysis. A data graph can represent link data. For example, a data graph can include vertices that represent books, papers, other publications, Web pages, blog posts or other media items, with edges indicating links (e.g., hyperlinks, citations) from one media item to another media item.

Alternatively, a network analysis tool performs subgraph matching queries in another use case scenario that involves streams of data with semantic information (providing attributes for vertices and edges) and connectivity information (for edges between vertices, which represent entities).

In some example scenarios, vertices and edges of a data graph are homogeneous. That is, the data graph includes one type of vertices (e.g., all vertices represent host machines; all vertices represent persons) and one type of edges (e.g., all edges represent the same type of packets between host machines; all edges represent relationships between persons). In typical scenarios, however, vertices of a data graph are heterogeneous and/or edges of the data graph are heterogeneous. That is, the data graph is composed of different vertex types and/or different edge types.

II. Example Computer Systems

FIG. 1 illustrates a generalized example of a computing system (100) in which several of the described innovations may be implemented. The computing system (100) is not intended to suggest any limitation as to scope of use or functionality, as the innovations may be implemented in diverse computing systems, including special-purpose computing systems adapted for network analysis.

With reference to FIG. 1, the computing system (100) includes one or more processing units (110, 115) and memory (120, 125). The processing units (110, 115) execute computer-executable instructions. A processing unit can be a central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for performance and usability enhancement for continuous subgraph matching query processing on graph-structured data, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, OS software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for performance and usability enhancement for continuous subgraph matching query processing on graph-structured data.

The input device(s) (150) may be a touch input device such as a keyboard, mouse, pen, or trackball, a voice input device, a scanning device, touchscreen, or another device that provides input to the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in modules, being executed in a computing system on a target real or virtual processor. Generally, modules include routines, programs, libraries, objects, classes, components, data structures, etc. that perform particular tasks or implement particular abstract data types. The functionality of the modules may be combined or split between modules as desired in various embodiments. Computer-executable instructions for modules may be executed within a local or distributed computing system.

The terms "system" and "device" are used interchangeably herein. Unless the context clearly indicates otherwise, neither term implies any limitation on a type of computing system or device. In general, a computing system or device can be local or distributed, and can include any combination of special-purpose hardware and/or hardware with software implementing the functionality described herein. The disclosed methods can be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms denote operations performed by a computer, and should not be confused with acts performed by a human being. The actual computer operations corresponding to these terms vary depending on implementation.

Figure 2:
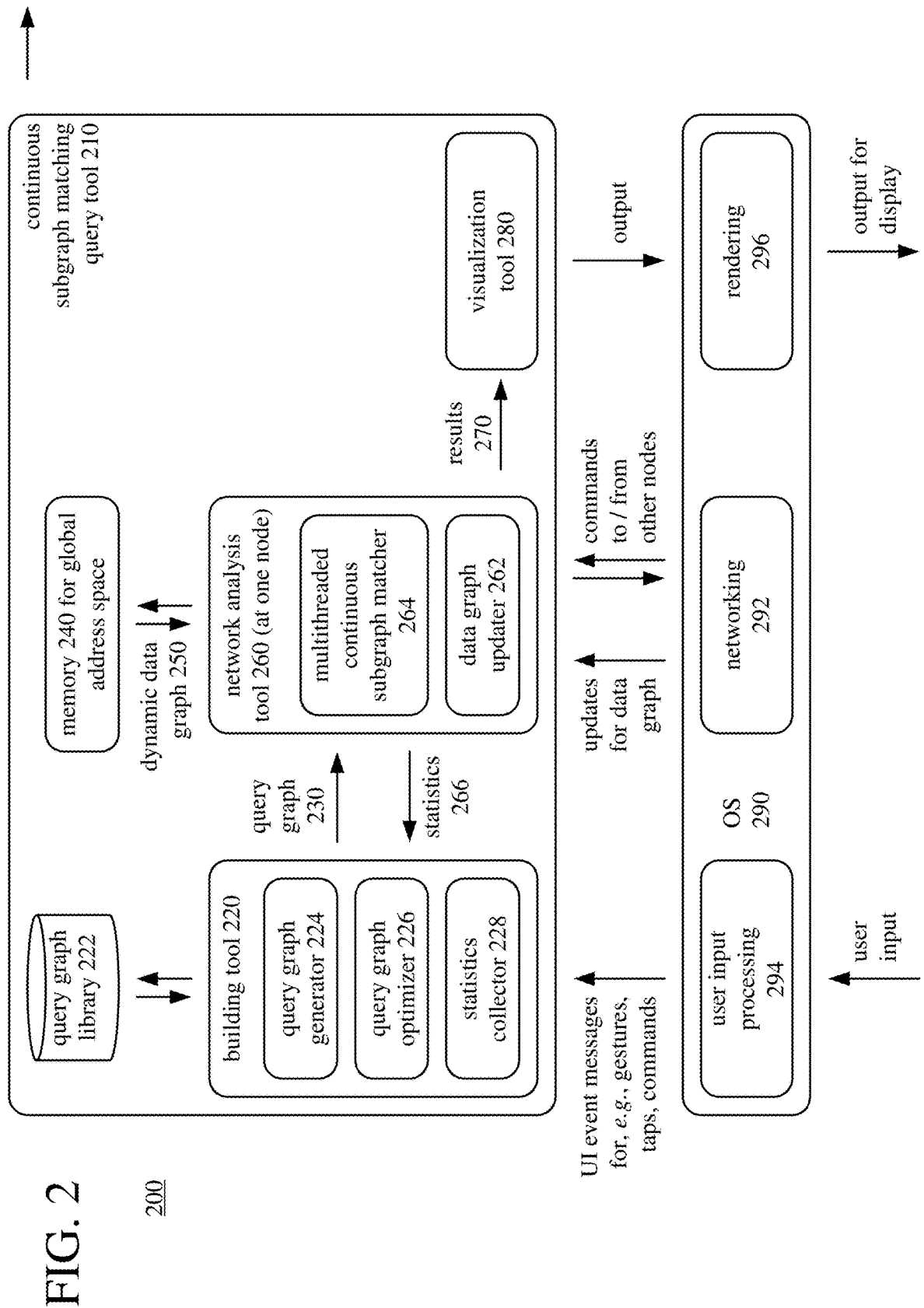
FIG. 2 is a block diagram illustrating an example software architecture that includes a query graph building tool, a network analysis tool, and a results visualization tool.

III. Example Architecture for Distributed Continuous Subgraph Matching Queries on Graph-Structured Data FIG. 2 shows an example software architecture (200) in which a continuous subgraph matching query tool (210) is configured to generate a query graph (230), maintain and update a dynamic data graph (250) (that is, graph-structured data, which is updated to incorporate streams of updates, prune old data, etc.), search for matches of the query graph (230) and its associated query subgraphs in the dynamic data graph (250), and present results (270) of continuous subgraph matching queries. The architecture (200) supports operations in a distributed computer system that includes a cluster of multiple nodes, which share memory (240) addressed according to a global address space. FIG. 2 shows a query graph building tool (220), network analysis tool (260), and results visualization tool (280) as being collocated, but the building tool (220), network analysis tool (260), and visualization tool (280) can instead be located at different nodes. Further, although FIG. 2 shows the network analysis tool (260) at a single node, operations of the network analysis tool (260) can be distributed among multiple nodes. A computer system (e.g., smartphone, tablet computer, personal computer, or other computing system) can execute software organized according to the architecture (200).

The architecture (200) includes an operating system ("OS") (290) and continuous subgraph matching query tool (210) that uses services of the OS (290). In FIG. 2, the OS (290) includes components for rendering (e.g., rendering visual output to a display), components for networking, and components for input processing. Other components of the OS (290) are not shown. In general, the OS (290) is configured to manage user input functions, output functions, storage access functions, network communication functions, and other functions for the computing system. The OS (290) provides access to such functions to the continuous subgraph matching query tool (210) and other software running on the computing system.

A networking module (292) of the OS (290) is configured to receive one or more streams of updates to a data graph. For example, in the context of computer network security, the networking module (292) is configured to receive, as part of one or more streams (time series) of updates, network flow information from one or more network probes of a computer network in an IPFIX format, Netflow format, or other format. Or, in another context, the OS (290) is configured to receive streams of update data from some other type of event monitors. The networking module (292) acts as a collector of messages that include the update data. The networking module (292) can provide the updates for the data graph to the data graph updater (262) of the network analysis tool (260) by passing the messages. Or, the networking module (292) can extract the update data from the messages and provide the update data directly to the data graph updater (262). The networking module (292) is configured to send requests to event monitors (such as network probes) and/or send replies to event monitors, regarding the messages that include the update data.

A user generates user input, which can be tactile input such as touchscreen input, mouse input, button presses or key presses, or can be voice input. An input processing module (294) of the OS (290) includes functionality for recognizing taps, finger gestures, or other input to a touchscreen, recognizing commands from voice input, mouse input, button input or key press input, and creating messages that can be used by the continuous subgraph matching query tool (210). The continuous subgraph matching query tool (210) listens for UI event messages from the input processing module (294). The UI event messages can indicate a gesture or tap on a touchscreen, mouse input, key press input, or another UI event (e.g., from voice input, directional buttons, trackball input). If appropriate, the continuous subgraph matching query tool (210) can react to the user input (or another type of notification) by making one or more calls to the OS (290) or performing other processing. For example, based on user input, the building tool (220) can modify a query graph, the network analysis tool (260) can start a continuous query process, or the visualization tool (280) can adjust how results are rendered.

The building tool (220) includes a query graph generator (224), a query graph optimizer (226), and a statistics collector (228). The query graph generator (224) is configured to receive and react to user input events. For example, the query graph generator (224) reacts to user input that indicates a selection of a query graph template or previously-created instance of query graph by loading the query graph (230) for the selected template or instance from the query graph library (222). The query graph library (222) can store multiple available query graph templates as well as previously-created instances of query graphs. The query graph generator (224) is also configured to change the data graph (230) in reaction to user input that indicates changes to the query graph (230), such as addition or removal of a vertex, addition or removal or an edge, or changes to an attribute of the query graph (230). In the context of computer network analysis, the attributes of a vertex can include label, host name, machine or address type, IP address, and/or port number. The attributes of an edge can include transport protocol, message type, packet length, timestamp, and/or order. The query graph (230) can be saved in the query graph library (222) and/or passed to the network analysis tool (260) for use in a continuous query process. Additional examples of operations of the query graph generator (224) are described below.

The query graph optimizer (226) is configured to decompose the query graph (230) into multiple query subgraphs. The query graph optimizer (226) can follow a depth-first traversal, breadth-first traversal, or statistically-driven traversal of the query graph (230) to generate the multiple query subgraphs. The query graph optimizer (226) can also react to user input that affects how the query graph (230) is decomposed into query subgraphs. The query graph optimizer (228) can create an SJ tree that organizes the query subgraphs. When the query graph (230) is passed to the network analysis tool (260) for use in a continuous query process, the multiple query subgraphs and SJ tree are also passed to the network analysis tool (260).

The statistics collector (228) is configured to receive statistics (266) from the network analysis tool (260) (or visualization tool (280)) that describe results of continuous subgraph matching query processing that uses the query graph (230). The building tool (220) can present the statistics (266) in a user interface. Statistics (266) for the query graph (230) and/or its query subgraphs can be compared or juxtaposed against normative patterns. This may help a user determine which of the query subgraphs has the most discriminatory strength and/or assess how many false positives are likely with the query graph (230). The query graph generator (224) is further configured to receive additional user input as feedback, then change the query graph (230) in response. In this way, the user can define the query graph (230) and its query subgraphs, and then iteratively refine query graph (230) and its query subgraphs in response to feedback from the continuous query process.

The memory (240) addressed according to a global address space is configured to store the dynamic data graph (250). Section V describes example architectures for the memory (240).

The network analysis tool (260) includes a data graph updater (262) and a multithreaded continuous subgraph matcher (264). The data graph updater (262) is configured to receive one or more streams (time series) of updates for the dynamic data graph (250) and make changes to the dynamic data graph (250). For example, the data graph updater (262) is configured to add one or more vertices, add one or more edges between vertices, and/or modify one or more attributes (of edges or vertices) as indicated in the updates. Concurrently, the data graph updater (262) can remove one or more vertices and/or remove one or more edges after those vertices/edges have "aged out" of the dynamic data graph (250). Operations of the data graph updater (262) can be executed in parallel with multiple processing cores of the node at which the network analysis tool (260) operates. Also, update operations for the dynamic data graph (250) can be distributed between different nodes of a cluster of nodes. Examples of update operations for the dynamic data graph (250), including update operations distributed between processing cores at one or more nodes, are described below.

To simplify subsequent analysis, the data graph updater (262) or networking module (292) can filter updates for the dynamic data graph (250) and/or aggregate updates for the dynamic data graph (250). Filtering can reduce redundancy in the update data. Aggregation can reduce the overall cost of communication operations.

The multithreaded continuous subgraph matcher (264) is configured to receive the query graph (230) and search for matches of the query graph (230) and its query subgraphs in the dynamic data graph (250), which is dynamically updated. The continuous subgraph matcher (264) finds instances of complete matches of the query graph (230) or partial matches of one or more query subgraphs of the query graph (230) in the dynamic data graph (250). The continuous subgraph matcher (264) can work concurrently with the data graph updater (262). For example, when one or more new vertices/edges are added to the dynamic data graph (250), the continuous subgraph matcher (264) can evaluate whether the query graph (230) (or one or more of its query subgraphs) appears in the dynamic data graph (250) at the new edges/vertices. Operations of the continuous subgraph matcher (264) can be executed in parallel with multiple processing cores of the node at which the network analysis tool (260) operates. Also, query operations can be distributed between different nodes of a cluster of nodes. Examples of query operations, including query operations distributed between processing cores at one or more nodes, are described below. The network analysis tool (260) is also configured to provide results (270) of the continuous query process (e.g., information about complete matches, information about partial matches).

The results visualization tool (280) is configured to receive the results (270) of the continuous query process and render one or more graphics (such as a match graphic depicting complete matches and partial matches for the query graph (230) in the dynamic data graph (250) and/or a progress graphic depicting frequency of different query subgraphs) based on the results (270). Examples of graphics are described below. The visualization tool (280) is configured to call the rendering module (296) of the OS (290).

A rendering module (296) of the OS (290) is configured to handle the call(s) from the visualization tool (280) to generate views of the match graphic and any other graphic. Section IX describes examples of views for the visualization tool (280). The rendering module (296) is also configured to handle calls from the building tool (220) to generate views of the user interface used by the building tool (220). Section VIII describes examples of views for the building tool (220).

Alternatively, the OS (290) includes more or fewer modules. Or, the continuous subgraph matching query tool (210) includes more or fewer modules. A given module can be split into multiple modules, or different modules can be combined into a single module.

IV. Continuous Subgraph Matching Queries on Graph-Structured Data, in General

A continuous query is a query that logically runs continuously over time on a data set, even as that data set is dynamically updated, as opposed to being a query executed intermittently (e.g., at a scheduled interval) or on an ad hoc basis. A continuous query is typically "registered" into a network analysis tool, and then executed in a data-driven fashion against a data set. That is, the continuous query is executed on an updated data set when new data arrives. Even if the continuous query does not, strictly speaking, execute without interruption on the data set, the continuous query is logically continuous in that it continues execution as new data is added to the data set and/or old data is removed from the data set, without restarting the continuous query.

A query can be represented as a query graph that includes vertices and edges. The vertices and edges can have attributes. Similarly, the data set against which the query is applied can be represented as a data graph (graph-structured data), which includes vertices and edges that can have attributes. For a data set that tracks entities as well as relationships or activity between the entities, the graph-structured data provides a convenient logical representation (as opposed to a row/column representation or other representation common for a relational database). A network analysis tool attempts to find matches of the query graph within the data graph. That is, the query is executed to find whether the query graph appears in the data graph for the underlying data stream.

More formally, a graph G is an ordered pair G=(V, E), where V is the set of vertices in the graph, and E is the set of edges that connect the vertices. A labeled graph also includes sets of distinct labels (for attributes) for vertices and edges of the graph. Given a query graph $G_q$ and a larger data graph $G_d$ of data values, an "isomorphism" of the query graph $G_q$ in the data graph $G_d$ is a matching that involves a one-to-one correspondence between the vertices of the query graph $G_q$ and the vertices of the data graph $G_d$, such that all vertex adjacencies are preserved. In some example implementations, the query graph $G_q$ and data graph $G_d$ are directed graphs, in that each edge has an associated direction from one vertex to another vertex. The matching for the isomorphism accounts for attributes of vertices and edges—the network analysis tool checks whether the attributes for a vertex or edge in the data graph $G_d$ are the same as, or qualify as an example of, the attributes (if any) specified for a corresponding vertex or edge of the query graph $G_q$. A subgraph isomorphism of the query graph $G_q$ in the data graph $G_d$ is a matching that involves a one-to-one correspondence between the vertices of the query graph $G_q$ and the vertices of a subgraph $g_d$ of the data graph $G_d$, such that all vertex adjacencies are preserved. The matching for a subgraph isomorphism accounts for attributes of vertices and edges in the data graph $G_d$ and query graph $G_q$.

Figure 3:
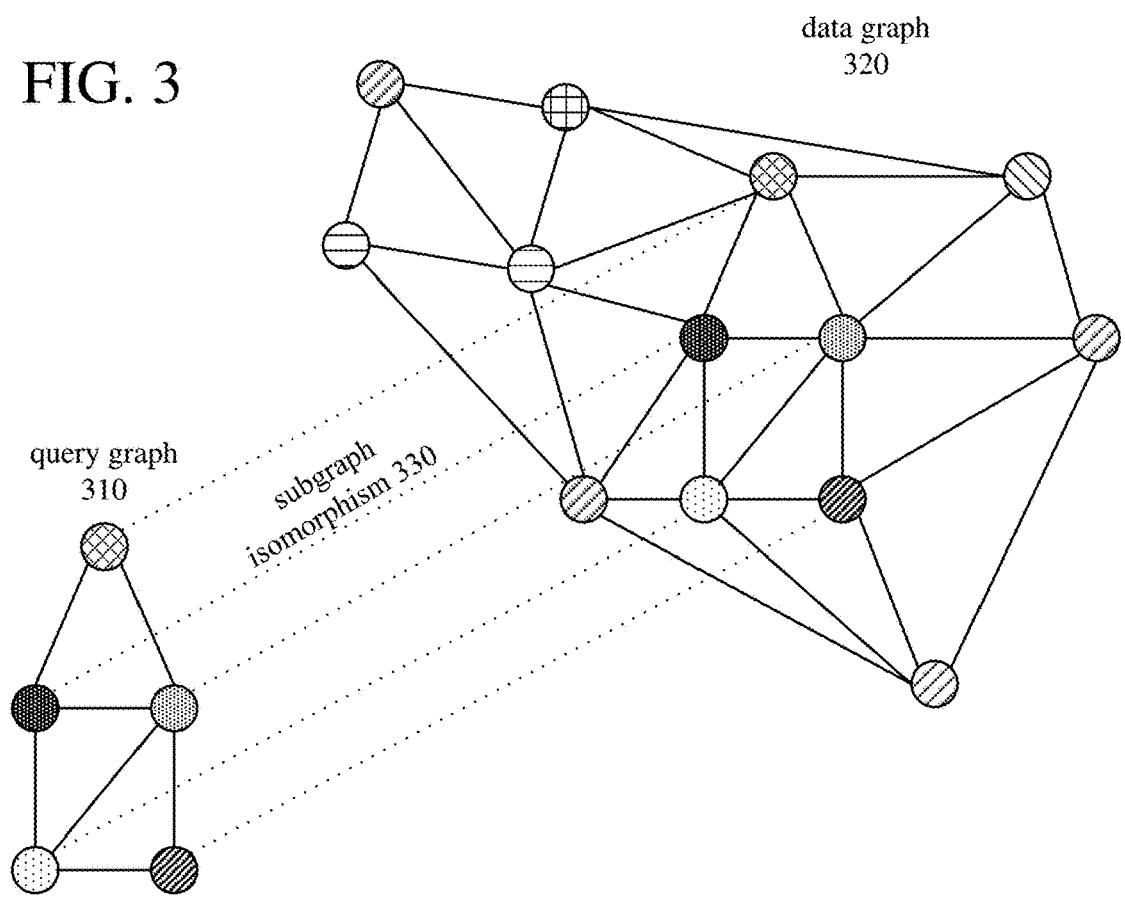
FIG. 3 is a diagram illustrating an example of subgraph isomorphism between a query graph and a data graph.

FIG. 3 shows an example of a subgraph isomorphism (330) between a query graph (310) and a data graph (320). The query graph (310) includes five vertices and seven edges between the vertices. In FIG. 3, different fill patterns for vertices signify different attributes associated with the vertices of the query graph (310). Edges of the query graph (310) can also have attributes (not shown) considered in the query process. For the subgraph isomorphism (330), an instance of the five vertices of the query graph (310) (including attributes) with qualifying edges is found among the vertices and edges of a subgraph of the data graph (320). There are other instances of subgraphs of five vertices with qualifying edges in similar patterns in the data graph (320), but the attributes of the vertices do not match.

The data graph $G_d$ can change dynamically as vertices and edges are added and, in some cases, removed from the data graph $G_d$. In some example implementations, each edge in the data graph $G_d$ has a timestamp associated with it. For any subgraph $g_d$ of the data graph $G_d$, the time interval $\tau(g_d)$ is the interval between the earliest and latest edge belonging to that subgraph $g_d$. Given the dynamic data graph $G_d$, the query graph $G_q$, and a time window $t_w$, the network analysis tool can find any instance of a subgraph $g_d$ that is isomorphic to the query graph $G_q$ in the data graph $G_d$ such that $\tau(g_d) < t_w$. Isomorphic subgraphs $g_d$ are examples of "complete matches" of the query graph $G_q$ within the data graph $G_d$. Given the time window $t_w$, edges can be deleted from the data graph $G_d$ as they become older than $t_{last} - t_w$, where $t_{last}$ is the timestamp of the newest edge in the data graph $G_d$.

In general, M ($G_d^k$) is the cumulative set of matches discovered until time step k, and $E_{k+1}$ is the set of edges that arrive at time step k+1. The network analysis tool computes a function $f(G_d, G_q, E_{k+1})$, which returns the incremental set of matches that result from updating $G_d$ with $E_{k+1}$. The results of the function $f(G_d, G_q, E_{k+1})$ are equal to $M(G_d^{k+1}) - M(G_d^k)$.

For a large data set, searching for a query graph can be computationally intensive. To make the process of query graph matching tractable for large data sets, a query graph $G_q$ can be decomposed into smaller query subgraphs. An SJ tree organizes the query subgraphs and tracks partial matches for the query subgraphs. In example implementations, the SJ tree T is a binary tree that includes vertices $V_T$. Each vertex in $V_T$ corresponds to a query subgraph of the query graph $G_q$. The root vertex of the SJ tree represents the complete query graph. The SJ tree T successively divides a query graph into two child query subgraphs. One or both of the child query subgraphs can be further divided into two child query subgraphs, and so on. Decomposition can follow a depth-first traversal of the query graph, breadth-first traversal, or statistically-driven traversal of the query graph, and can continue to an arbitrary number of levels. In example scenarios, decomposition is stopped when a "primitive" pattern is reached that is small enough, and discriminative enough, to be found efficiently in a data graph to signify an exact match of a query subgraph.

For a parent query subgraph (or the query graph at the root vertex), two sibling query subgraphs are split at a join point between the two sibling query subgraphs. Partial matches for the two sibling query subgraphs can be joined at the join point. The join point is one or more vertices that appear in each of the two sibling query subgraphs.

Figure 4:
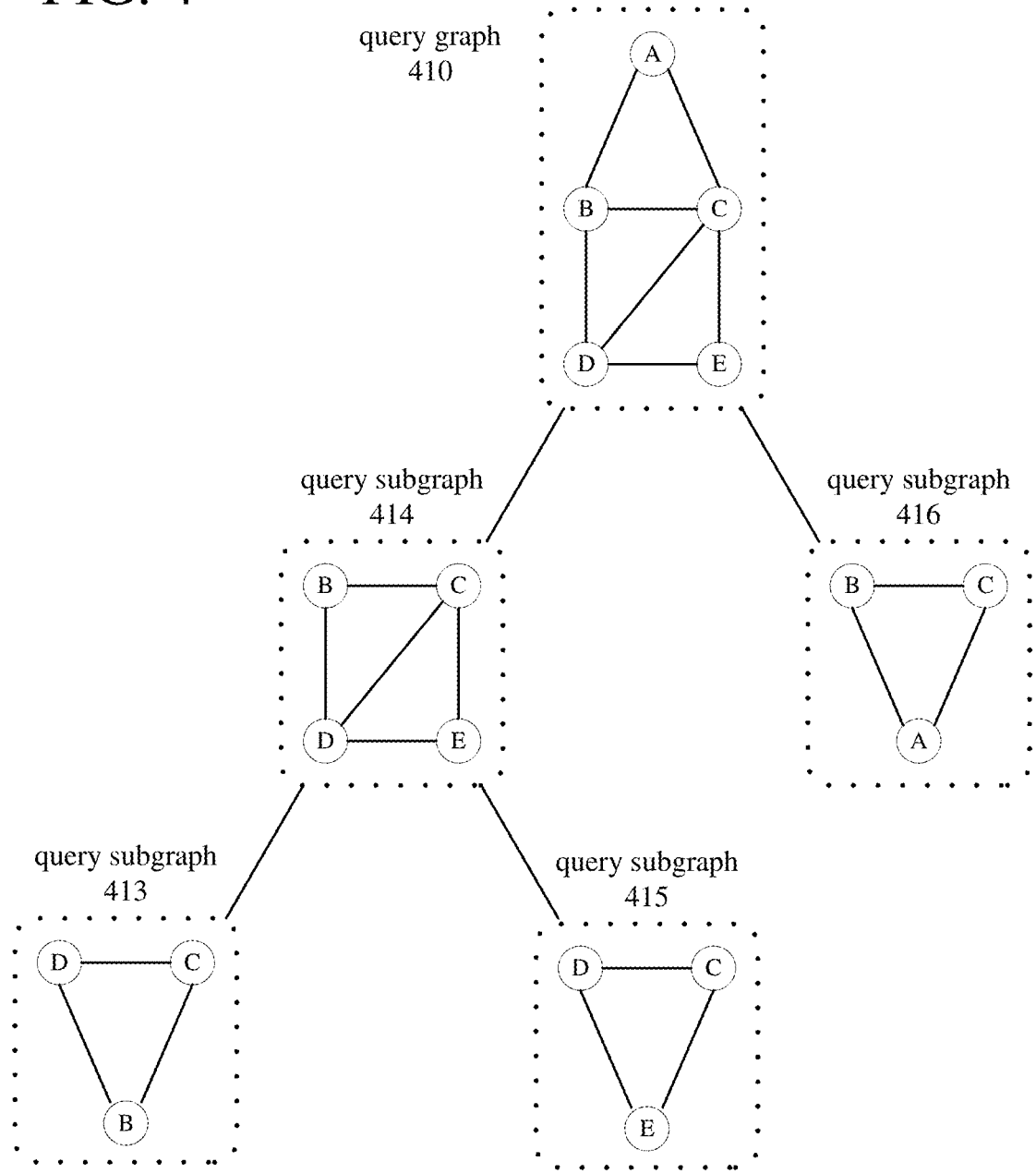
FIG. 4 is a diagram illustrating an example of decomposition of a query graph into multiple query subgraphs organized as an SJ tree.

FIG. 4 shows an example of decomposition of a query graph (410) into multiple query subgraphs (413, 414, 415, 416) organized as an SJ tree. The dotted lines represent vertices of the SJ tree. At the root vertex of the SJ tree, the query graph (410) includes five vertices (labeled A-E) and seven edges. At the first level of the SJ tree, the query graph has been split into two sibling query subgraphs (414, 416). The first query subgraph (414) at this level includes four vertices (labeled B-E) and five edges. The second query subgraph (416) at this level includes three vertices (labeled A-C) and three edges. The join point of the two query subgraphs (414, 416) is vertices B and C.

At the second level of the SJ tree, the first query subgraph (414) has been further split into two sibling query subgraphs (413, 415). The first query subgraph (413) at the second level includes three vertices (labeled B-D) and three edges. The second query subgraph (415) at the second level includes three vertices (labeled C-E) and three edges. The join point of the two query subgraphs (413, 415) at the second level is vertices C and D.

During the continuous query process, as partial matches are detected in the data graph for query subgraphs of a query graph, the partial matches are associated with the corresponding vertices of the SJ tree for that query graph. Each non-root vertex of the SJ tree can have an associated set of partial matches that have been found for the query subgraph associated with the vertex. A partial match at a non-root vertex in the SJ tree may be joined to another, previously-occurring partial match at a sibling vertex in the SJ tree to form a larger match, which is in turn associated with a set of matches for the parent vertex in the SJ tree. Thus, partial matches for sibling query subgraphs in the SJ tree may be combined to form a larger partial match (or complete match) higher in the SJ tree. For two partial matches of sibling query subgraphs to be joined, the partial matches have matching vertice(s) at their join point. (That is, the two partial matches share vertice(s) at the join point.) Even after the two partial matches are joined, the lower-level partial matches are retained, as they may continue to be joined in later operations as more partial matches emerge, even if the larger partial match is removed.

In general, matches that occur higher in the SJ tree indicate a higher probability that the complete target pattern (for the query graph) is occurring. By limiting exact subgraph matching to small, discriminative patterns and using the SJ tree to incrementally grow partial matches, the network analysis tool can efficiently grow partial matches into complete matches for query graphs.

More formally, a match or partial match can be represented as a set of edge pairs. Each edge pair represents a mapping between an edge in the query graph $G_q$ and its corresponding edge in the data graph $G_d$. Given two subgraphs $G_1=(V_1,E_1)$ and $G_2=(V_2, E_2)$, the join operation is defined as $G_3=G_1 \bowtie G_2$, such that $G_3=(V_3, E_3)$ where $V_3=V_1 \cup V_2$ and $E_3=E_1 \cup E_2$. The query subgraph that corresponds to the root vertex of the SJ tree T is isomorphic to the query graph $G_q$. The leaf vertices of the SJ tree T represent subgraphs directly used for searching in the data graph $G_d$. The query subgraph corresponding to any internal vertex of the SJ tree T is isomorphic to the output of the join operation between the subgraphs for the two child vertices of that internal vertex. Thus, an internal vertex of the SJ tree T represents the result of joining to lower-level vertices. Along with its associated query subgraph, each vertex in the SJ tree T maintains a set of matches, where each of the matches corresponds to an instance of an isomorphic subgraph in the data graph $G_d$ for the query subgraph. Each internal vertex $v_{internal}$ of the SJ tree also maintains a subgraph CUT-SUBGRAPH($v_{internal}$) that equals the intersection of the query subgraphs of its child vertices.

FIG. 5a shows pseudocode for an example process (501) of dynamic graph searching in a serial implementation. The inputs to the example process (501) are the data graph $G_d$, the SJ tree T that stores query subgraphs and associates sets of matches, and a batch of new edges in the data graph $G_d$. In the example process (501) at line 1, the network analysis tool gets the leaf vertices of the SJ tree T (shown as "leaf-nodes"). For each of the new edges (line 2), the network analysis tool adds (line 3) the edge $e_s$ to the data graph $G_d$. Then, for each of the leaf vertices (lines 4-9), the network analysis tool gets (line 5) the associated query subgraph $g_{sub}{}^q$ for the leaf vertex, and finds (line 6) any partial matches for the query subgraph $g_{sub}{}^q$ in the data graph $G_d$ at the new edge $e_s$. If any partial matches have been found (line 7), the network analysis tool adds (lines 8-9) the partial matches to the set of matches for the leaf vertex of the SJ tree T with calls to UPDATE-SJ-TREE, which can trigger join operations within the SJ tree T.

FIG. 5b shows pseudocode for an example process (502) of SJ tree updating in a serial implementation, for the function UPDATE-SJ-TREE. The inputs to the example process (502) are a vertex (shown as "node") and the partial match m to be added. Initially, the input vertex is a leaf vertex of the SJ tree T, but in a recursive call the input vertex can be an internal vertex of the SJ tree T. The network analysis tool gets (lines 1 and 2) the sibling vertex and parent vertex for the input vertex. For the join vertices between the input vertex and its sibling vertex (returned by CUT-SUB GRAPH[parent]), the network analysis tool calculates a hash value to get (line 3) a key k for the input partial match m. The network analysis tool retrieves (line 4) the set of matches $H_s$ associated with the sibling vertex, then gets (line 5) those matches $M_s{}^k$ from $H_s$ that have the same key k (that is, whose join vertices yield the same hash value). For each of the matches $M_s{}^k$ from $H_s$ that has the same key k (lines 6-11) (also called join candidates for the input partial match m), the network analysis tool performs (line 7) a subgraph join operation between the partial match $m_s$ (join candidate) from the sibling vertex and the input partial match m, yielding a higher-level match $m_{sup}$. In the parent vertex is the root vertex of the SJ tree T, the network analysis tool processes (lines 8-9) the higher-level match $m_{sup}$ as a complete match of the query graph. Otherwise, the network analysis tool processes (lines 10-11) the higher-level match $m_{sup}$ as a partial match, recursively calling the function UPDATE-SJ-TREE with the parent vertex and higher-level match $m_{sup}$ as inputs. Finally, the network analysis tool adds (line 12) the partial match m (and its key k) to the set of matches for the input vertex.

In some example implementations, a query process for a query graph looks for only a rare query subgraph first. The rare query subgraph is more discriminative (or "selective")

than other query subgraphs. That is, the rare query subgraph, when it appears at all, is more likely to be a precursor of a complete match of the query graph. When the rare query subgraph has been found, the network analysis tool looks for more frequent query subgraphs around it. In this way, the network analysis tool can use a "lazy searching" process that avoids many "false positive" instances of partial matches that do not ever lead to a complete match for the query graph. For example, for a new edge in the data graph, the network analysis tool always looks for a partial match of the most selective query subgraph of a query graph. For any other query subgraph of the query graph, the network analysis tool looks for partial matches if and only if a partial match for the sibling query subgraph has been found in the neighborhood of the new edge. Examples of lazy searching and modifications to the dynamic search process are described in Choudhury et al., "A Selectivity-based Approach in Continuous Pattern Detection in Streaming Graphs" (2015), the disclosure of which is hereby incorporated by reference.

V. Example Hardware for Distributed Architecture

The process of searching for query subgraphs of a query graph in a dynamic data graph can be implemented in a distributed computing architecture. In some example implementations, the architecture uses lightweight software multithreading with processing cores at different nodes, aggregation of messages between nodes, and a partitioned global address space ("PGAS") data model for memory at the nodes. Distributed data structures in memory at the nodes store graph data and other data used in the continuous subgraph matching queries.

A. Example Architectures.

Figure 6:
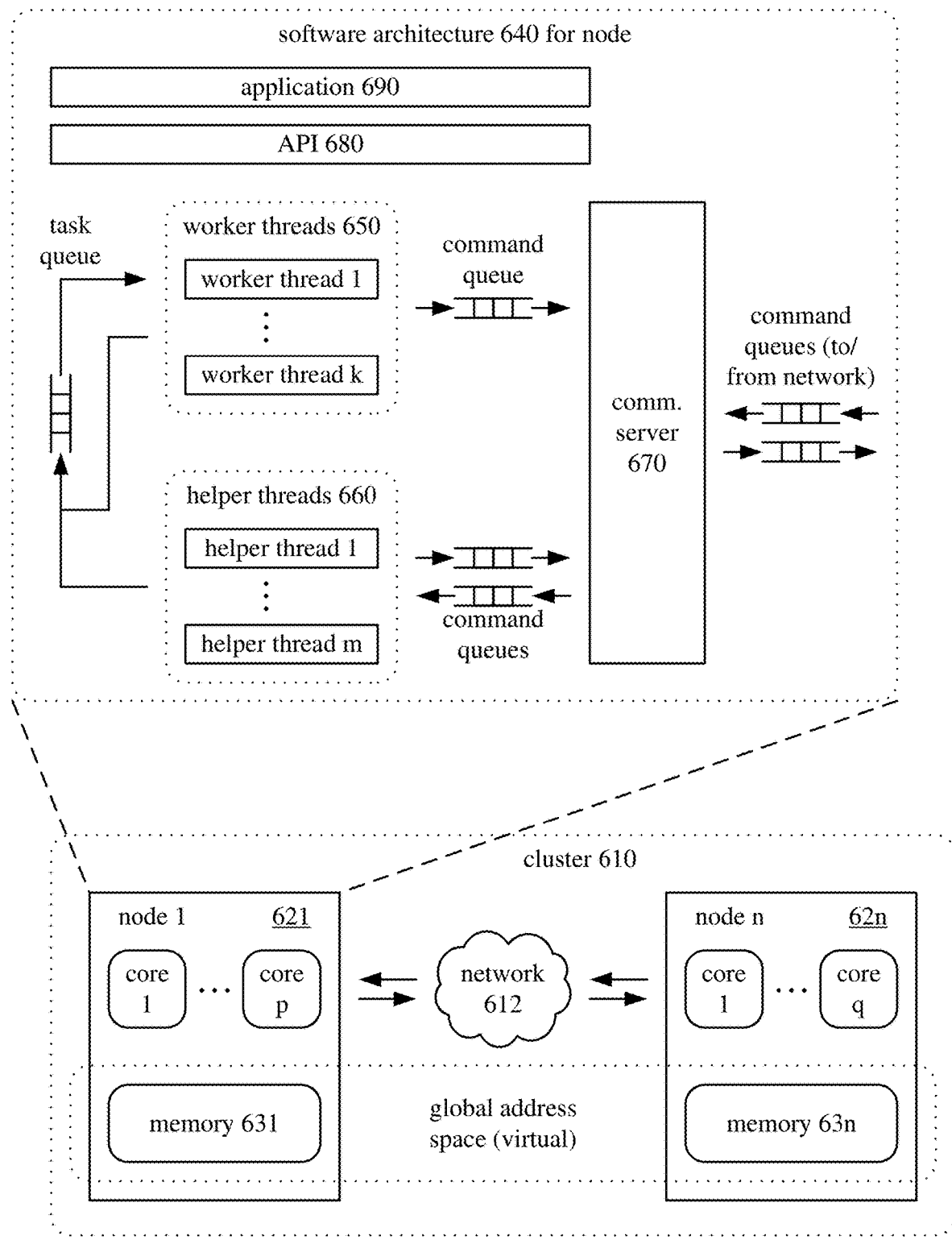
FIG. 6 is a diagram illustrating an example architecture for continuous subgraph matching query processing in a distributed computer system that includes a cluster of multiple nodes.

FIG. 6 shows an example architecture (600) for continuous subgraph matching query processing in a distributed computer system that includes a cluster (610) of multiple nodes. The cluster (610) includes multiple nodes, labeled node 1 (621) to node n (62n) in FIG. 6. The multiple nodes (621 . . . 62n) are connected over a network (612) such as the Internet. Each of the nodes (621 . . . 62n) includes multiple processing cores and memory. Different nodes (621 . . . 62n) can have the same count of processing cores or different counts of processing cores, and the same amount of memory or different amounts of memory. For example, node 1 (621) includes p processing cores (labeled 1 . . . p) and memory (631), and node n (62n) includes q processing cores (labeled 1 . . . q) and memory (63n). The memory (631 . . . 63n) is addressed according to a global address space. The PGAS model uses a shared memory abstraction on distributed memory (631 . . . 63n) at the different nodes (621 . . . 62n) of the cluster (610), without neglecting locality principles. The memory (631 . . . 63n) at different nodes (621 . . . 62n) provides a uniform memory space (that is, a shared memory view) even though the memory (631 . . . 63n) is physically distributed. The PGAS model enables allocation and access of difficult-to-partition data sets in the aggregate memory (631 . . . 63n) of the nodes (621 . . . 62n) of the cluster (610). Each of the nodes (621 . . . 62n) also includes local memory used to store instructions and data for operations at that node. Nodes (621 . . . 62n) can exchange requests (in the form of commands) for remote memory access. Even if remote access primitives are adapted for more regular applications and data sets, multithreading can hide the latencies of memory or network data accesses.

FIG. 6 also shows a software architecture (640) for one node ("local node"). Each of the nodes (621 . . . 62n) of the cluster (610) can run software organized according to the software architecture (640), communicating through commands exchanged between the nodes (621 . . . 62n). Different commands can specify different operations, such as global data read operations, global data write operations, synchronization operations, or thread management operations.

For the continuous query process, the local node uses one or more worker threads (650), one or more helper threads (660), a communication server (670), and assorted queues and other data structures. In general, the worker thread(s) (650), helper thread(s) (660), and thread for the communication server (670) are scheduled for execution on the processing cores of the local node. In some example implementations, a thread (e.g., for the communication server (670) at a node) can be durably assigned to a processing core.

An application (690) can access functionality provided as part of the software architecture (640) through an application programming interface ("API") (680). Instructions for the application (690) can be partitioned into tasks. Each task represents a set of operations (e.g., for updating a data graph, for identifying partial matches, or for joining partial matches). One of the queues (task queue) buffers one or more indicators for tasks, for distribution of the tasks to the worker thread(s) (650). In some example implementations, the indicator for a task includes a function pointer and execution context. Alternatively, a task can be represented in some other way.

Each of the worker thread(s) (650) is operable to execute, on one the multiple processing cores of the local node, a set of one or more of the tasks. Each of the worker thread(s) (650) is also operable to generate outgoing commands for requests. An outgoing command can be directed within the local node and/or to one or more other nodes ("remote nodes") among the multiple nodes (621 . . . 62n). A worker thread outputs a command to a command queue, for delivery to the communication server (670). A worker thread can also output an indicator for a task to the task queue, for later assignment to a worker thread at the local node. In general, a worker thread can switch between tasks (and contexts) at various times, e.g., when it generates a blocking command that involves a remote memory operation.

Each of the helper thread(s) (660) is operable to manage reads and writes to the global address space, and handle synchronization operations. Each of the helper thread(s) (660) is also operable to handle incoming commands for requests to the local node. Finally, each of the helper thread(s) (660) is operable to generate outgoing commands for replies to one or more remote nodes. A helper thread can also output an indicator for a task to the task queue, for later assignment to a worker thread at the local node.

The communication server (670) is operable to, as a communication endpoint for the local node on the network (612), manage communication of incoming commands from one or more remote nodes and manage outgoing commands to one or more remote nodes. The worker thread(s) (650) and helper thread(s) (660) may send commands (through a command queue) to the communication server (670) for delivery to one or more remote nodes. Similarly, through a command queue filled by the communication server (670), the helper thread(s) (660) may receive commands from one or more remote nodes. Incoming or outgoing commands can be aggregated by the communication server (670). Concurrency, through software multithreading, can compensate for added latency due to aggregation of communications.

In general, for query subgraph processing in the software architecture (640), opportunities for parallel execution using multiple processing cores are available at parallel iterations through a loop. For example, a task can be executed in parallel for different iterations through a loop that adds vertices or edges to a data graph. More generally, the parallel loop construct in the software architecture (640) enables parallel execution of tasks from iterations of loops over independent individual structure elements (e.g., parallel loops over all vertices or edges of a graph).

B. Example Data Structures.

A data graph can be represented in memory addressed according to a global address space (e.g., in memory (631 . . . 63*n*) of different nodes (621 . . . 62*n*) of the cluster (610) shown in FIG. 6. In this case, the respective nodes receive update data and make changes to the portion of the data graph stored in memory at that node. Each of the nodes holds part of the data graph, which allows continuous query processing to proceed even if the data graph is too large to fit in memory at any single one of the nodes. Each of the nodes can then perform specific tasks on the data in its memory (e.g., searching for query subgraphs) and report results to an SJ tree. The SJ tree itself can be stored in global memory at the nodes.

Figure 7:
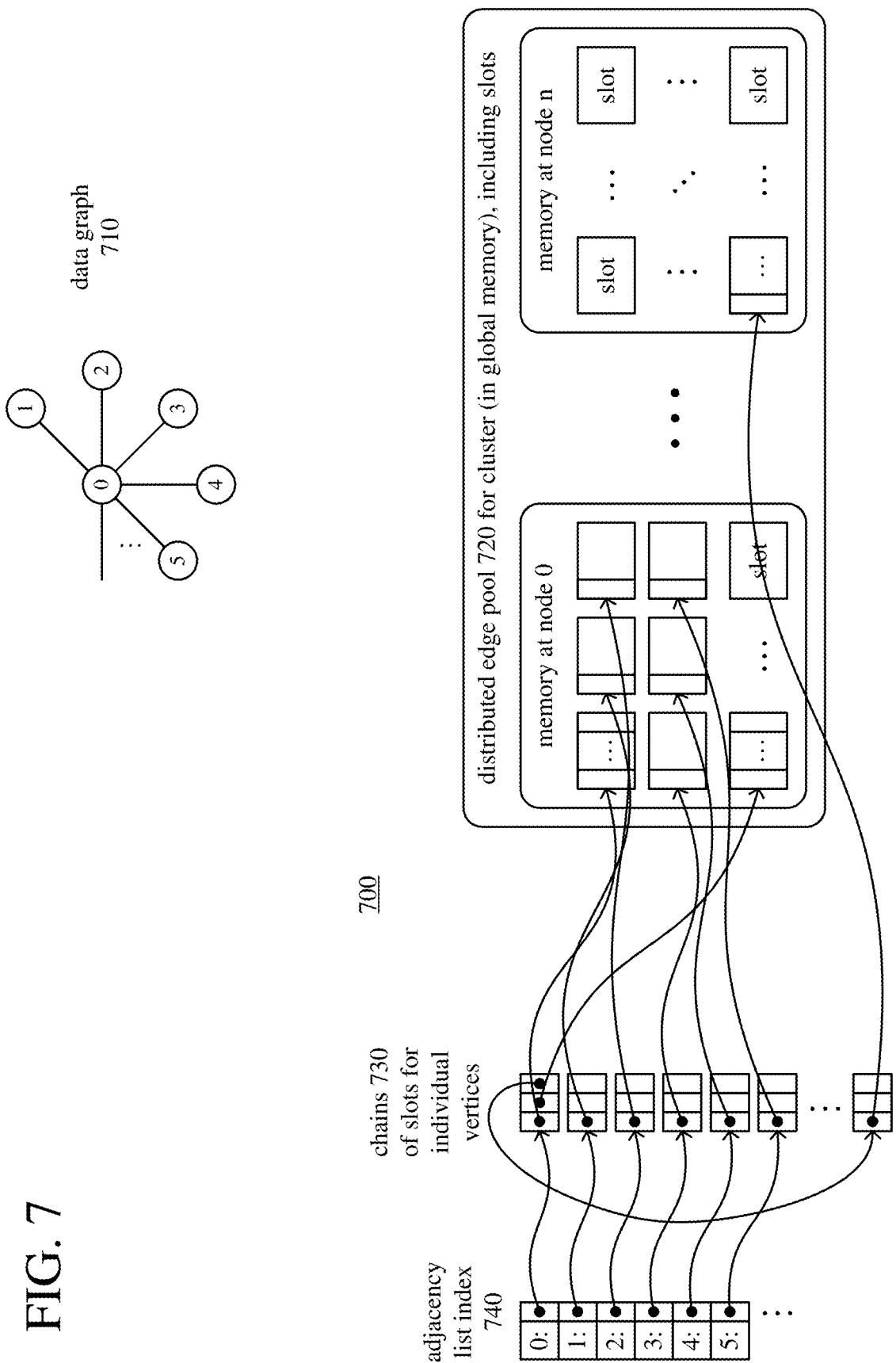
FIG. 7 is a diagram illustrating example data structures for storing a dynamic data graph in memory addressed according to a global address space.

FIG. 7 shows example data structures (700) for storing a dynamic data graph in memory addressed according to a global address space. At least some of the example data structures (700) are distributed in memory at different nodes. The data structures (700) include an adjacency index list (740) with entries for vertices, chains (730) of references to slots for individual vertices, and an edge pool (720) divided into slots.

For a given vertex of the data graph, one of the slots of the edge pool (720) stores an adjacency list. The adjacency list enumerates (as edge information) one or more other vertices of the data graph that are connected by edge to the given vertex of the data graph. In some example implementations, the edge pool (720) is a pre-allocated array in distributed memory. A maximum count of vertices and maximum count of edges can be defined for a data graph, which limits how much memory is allocated for the edge pool (720). Even if the size of the data graph is not known in advance, a reasonable approximate size (considering previous results, window size for aging out edges, etc.) such as 10 million edges, 100 million edges, or 1 billion edges can be defined.

The slots of the edge pool (720) can be allocated in various ways. In some example implementations, the slots are distributed at least approximately evenly among the multiple nodes of the cluster, starting from node 1. Alternatively, the slots can be distributed unevenly between different nodes of the cluster. The data graph (especially the distribution of slots) can be periodically rebalanced between nodes. This can improve performance if the memory at one node becomes too full (as vertices and edges are added) or too empty (as vertices or edges are removed).

Initially, each vertex is assigned a slot to store its neighbors. As the neighbor list for a vertex outgrows a slot, a next available slot in the edge pool (720) is assigned to the vertex. The edge pool (720) can be viewed as a circular buffer containing the slots. New edges can be added by writing entries to slots and, as needed, assigning new slots in which to write entries for the new edges. Successive slots that store the edges of a vertex of the data graph can be assigned in memory on the same node or different nodes of a cluster. When edges are aged out (e.g., according to timestamp criteria), a slot that includes no active edges can de-allocated (in effect) by emptying or overwriting its contents, and then assigned to another vertex.

The slots of the edge pool (720) can have a fixed size (e.g., each having 8 entries by default, or each having 16 entries by default). Since the size of the data graph and size of the adjacency lists for vertices are unknown, the slot size can be selected according to various criteria. Using a small slot size can be inefficient if many vertices have a large number of edges, e.g., due to fragmentation of a large adjacency list into multiple slots. On the other hand, using a large slot size can be inefficient if a large number of vertices have very few edges represented in their adjacency lists. A slot size of 8 or 16 is a good balance for most scenarios—especially if the network analysis tool can compensate for fragmentation by processing adjacency lists in parallel.

Retrieving a list of neighbors for a vertex is a core operation for the data graph. To handle cases in which an adjacency list is fragmented into multiple slots, multiple slots can be "chained" together. One way to implement chaining is for the last entry of a slot to include a reference (such as a pointer or offset) to a next slot in the edge pool (720) for the adjacency list. When the network analysis tool reaches the end of a slot, it makes a request to fetch the next slot, which may involve sending the request across a network. Sequentially accessing edges by traversing a chain of slots may be slow.

FIG. 7 shows an alternative approach to chaining slots, which uses a multi-level adjacency list structure. In FIG. 7, the adjacency list index (740) has multiple entries. The adjacency list index (740) can be allocated in global memory. For a vertex of the data graph, a corresponding one of the entries of the adjacency list index (740) stores a reference to the corresponding chain for that vertex.

The chains (730) provide an intermediate layer of indexing. For a vertex, the corresponding chain is a list of references (pointers, offsets, etc.) to slots associated with the vertex. The chains (730) can be allocated as an array in memory addressed according to the global address space. Each section of the array includes a fixed number of references (e.g., 3 in FIG. 7). When one section of the array is full, the last entry of that section can be a reference (pointer, offset, etc.) to another section of the array. In this way, the chain of references to slots for a given vertex can be implemented as a linked list of sections of the array.

In the adjacency list index (740), a new entry can be added to add a vertex to the data graph. To remove a vertex from the data graph, the corresponding entry of the adjacency list can be overwritten. Typically, a vertex is removed if it has no edges to/from it.

In the preceding examples, the data structures (700) are stored in global memory. Alternatively, at least some of the data structures (e.g., adjacency list index (740), chains (730)) may be replicated at the different nodes. Although this entails additional operations to maintain and update the replicated data structures, threads at each node may more quickly determine locations of slots in global memory when retrieving edge information.

FIG. 7 shows how part of an example data graph (710) is represented in the adjacency list index (740), chains (730), and edge pool (720). The illustrated part of the data graph (710) is a simple subgraph that includes six vertices, labeled 0 to 5. Edges connect vertex 0 to each of the other vertices (1-5). Edges also connect vertex 0 to a large number of other vertices (not shown). The adjacency list index (740) includes an entry for each of the vertices. The entry for vertex 0 stores a reference (pointer, offset, etc.) to the chain for vertex 0. The chain includes two references to slots, followed by a reference to another section of the array, which stores another reference to a third slot. The three slots for vertex 0 store information about edges that connect to vertex 0. For each of the other vertices (1-5), an entry of the adjacency list index (740) stores a reference to the corresponding one of the chains (730) for that vertex. Each chain includes a reference to a single slot, which stores information about the single edge for that vertex.

VI. Continuous Subgraph Matching Queries on Graph-Structured Data in a Distributed Architecture Section IV describes examples of continuous subgraph matching queries that can be performed on graph-structured data in a serial manner in a non-distributed architecture. Such continuous subgraph matching queries can be adapted to work in a distributed architecture, taking advantage of opportunities to perform operations in parallel on different processing cores and/or nodes. In particular, update operations, matching operations, and certain join operations can be adapted to work in a distributed architecture. This can help make execution of continuous subgraph matching queries tractable for large, dynamic data graphs.

For execution of continuous subgraph matching queries in a distributed architecture, a network analysis tool still maintains a data graph and an SJ tree, which acts as a container for sets of partial matches associated with different query subgraphs. In a serial approach (see section IV), the network analysis tool can process each incoming new edge for the data graph by performing operations to (a) add the new edge to the data graph, (b) perform searches for all appropriate query subgraphs around the new edge (which, for "lazy searching," may be the most selective query subgraph and any triggered query subgraphs), and (c) update the SJ tree by adding the partial matches found in step (b) and joining small partial matches, when possible, to produce larger partial matches or even complete matches in the SJ tree. Sequential processing of edges, one edge after another, ignores significant opportunities for parallelism to be exploited by a multi-core system or multi-node system.

This section and the following sections describe operations performed by a network analysis tool. When the network analysis tool performs operations in parallel, different threads executing on processing cores at one node or multiple nodes can perform tasks for the operations. For the sake of presentation, however, the operations may still be described as being performed by the network analysis tool. In a SIMD architecture, multiple processing cores on a single node (or even different nodes) can be controlled to perform the same operations, as specified in a set of one or more tasks.

Large sets of updates, streamed from event monitors, can be processed in parallel. In a streaming context, the network analysis tool can accumulate batches of updates to a data graph until a threshold count of updates is reached or a threshold time (between operations) has been reached. Then, the network analysis tool can process the updates in parallel with variations of operations (a), (b), and (c) to take advantage of multiple processing cores (on a single node or multiple cores). That is, the network analysis tool performs operations in parallel for different updates to a distributed, dynamic data graph, thereby adding new edges, new vertices, etc. The network analysis tool also performs operations in parallel at the sites of different updates to search for query subgraphs, thereby finding partial matches. The network analysis tool also performs operations in parallel to update the SJ tree, performing parallel hash join operations between new sets of partial matches and cumulative sets of partial matches in the SJ tree at different levels.

At a given node in a multi-node system, operations are performed with one or more of the processing cores at the given node to receive an update (e.g., new edge) to the data graph and change the data graph (e.g., add the new edge). Aside from adding edges, the data graph can be updated to add a vertex, remove an edge, and/or remove a vertex. For example, if the multi-node system uses an architecture as described with reference to FIG. 6 and data structures as described with reference to FIG. 7, each of the vertices of the data graph is assigned to chain (list) of slots, which store the adjacency list information (edge information) for that vertex. The chains and slots use dynamic array structures. To add an entry (for a given new edge) to the adjacency list for a given vertex, a worker thread executing on one of the processing cores can perform operations as follows. The worker thread obtains a lock to gain exclusive access to the adjacency list for the given vertex. The worker thread uses an atomic transaction to increment a counter that indicates the size of an adjacency list for the given vertex. The worker thread checks whether the counter has reached a size threshold (e.g., the next multiple of the slot size). If so, the worker thread increases the size of the adjacency list for the given vertex (e.g., adding a slot with a count of new entries equal to the slot size). The worker thread adds the given new edge to the adjacency list for the given vertex and releases the lock. Once the lock is released, all threads use the updated value of the counter and updated adjacency list to proceed. Alternatively, if the adjacency list is maintained using other data structures, the adjacency list is updated in a manner appropriate for those data structures, with a lock mechanism used as needed to avoid conflicting changes to the adjacency list by different worker threads. In parallel operations in the distributed architecture, multiple threads executing update tasks may attempt to append new entries to an adjacency list at the same time. As such, data graph update operations are implemented in a thread-safe manner.

After an edge is added, operations are also performed to search for partial matches, if any of one or more query subgraphs within the data graph around the site of the update (e.g., at the new edge). The searching can follow a "lazy search" approach in which the network analysis tool evaluates only a high-selectivity query subgraph and, if applicable, a query subgraph triggered by an earlier partial match in the neighborhood. Alternatively, the searching can evaluate all of the query subgraphs for leaf vertices of the SJ tree (or at least all unique query subgraphs among leaf vertices of the SJ tree) at the site of the update.

For example, if the multi-node system uses an architecture as described with reference to FIG. 6, a worker thread performs a subgraph isomorphism for a query subgraph around the site of the update. The data structures used to represent a partial match depend on implementation. For example, a given partial match is represented with multiple map structures. A first map structure stores information that indicates correspondence between vertices of a given query subgraph and counterpart vertices in the data graph for a partial match. A second map structure stores information that indicates correspondence between edges of the given query subgraph and counterpart edges in the data graph for the partial match. Since parallel search operations may generate thousands or even hundreds of thousands of partial matches, efficient implementation of the map data structures can significantly affect overall performance. Example implementations avoid C++ map data structures due to their high overhead of initialization. Also, typical query subgraphs are small, which may cause requests of many small memory fragments for the map data structures used to represent partial matches. Example implementations use small, fixed-size arrays allocated from a memory pool for the map data structures.

With the one or more processing cores at the given node, operations are then performed to add the new partial matches, if any, of the one or more query subgraphs to one or more corresponding new sets of partial matches of the SJ tree. For example, for a given query subgraph that has been searched, partial matches are added to a corresponding new set of partial matches stored in memory addressed according to a global address space at the given node or another node.

If the multi-node system uses an architecture as described with reference to FIG. 6, a worker thread inserts a partial match obtained from the search stage into the appropriate new set of partial matches in the SJ tree. Each of the vertices of in the SJ tree maintains (with a table or other data structure) a new set of partial matches that have been found in the search stage and also maintains an old set of partial matches that have been found in previous searches. The sets of partial matches can be stored in global memory across the multiple nodes in the cluster. Any partial match that is found by a worker thread in the search stage is copied from local memory at the given node to the memory addressed according to the global address space. Specifically, the new partial match is copied into the appropriate new set of partial matches in global memory with a "deep copy" operation, using a function such as memcpy that copies the entire partial match from the local stack or heap to the global memory.

With the one or more processing cores at the given node, operations are then performed to update the SJ tree. Typically, the search stage yields a large number of partial matches, and updates to the SJ tree happen concurrently. FIG. 8a shows an example process (801) for updating the SJ tree with parallel operations during execution of continuous subgraph matching queries on graph-structured data. The last line of the example process (801) shown in FIG. 8a includes two subgraph join operations between sets of partial matches. Each of the subgraph join operations can be efficiently implemented with parallel operations as shown in the example process (802) of FIG. 8b.

With reference to FIG. 8a, the network analysis tool determines (line 1) the number of leaf vertices (shown as $N_q$) of the SJ tree (shown as $T_{SJ}$). For the $N_q$ leaf vertices, the network analysis tool performs $N_q-1$ joins that correspond to the respective internal vertices of the SJ tree. In the serial approach explained with reference to FIGS. 5a and 5b, a single partial match is added to one of the leaf vertices in the SJ tree, triggering joins in progressively higher levels in the SJ tree until there are no join candidates to join. In contrast, for the parallel approach, for each of the internal vertices of the SJ tree, the network analysis tool handles a new set of partial matches, which is denoted $\delta_k$ for vertex k. After the parallel search phase, there is a new set of partial matches ($\delta_k$) for each of the leaf vertices in the SJ tree. In some cases, the new set could be an empty set (no new partial matches for that leaf vertex) or include a single partial match, but typically the new set includes multiple partial matches.

For each internal vertex in the SJ tree, the network analysis tool identifies (lines 3-4) the two child vertices of that internal vertex. In FIG. 8a, the two child vertices are denoted $n_{left}$ and $n_{right}$ and determined according to a particular numbering convention for vertices of the SJ tree. More generally, the vertices of the SJ tree can be organized according to another numbering convention. A child vertex can be a leaf vertex, in which case the new set of partial matches ($\delta_k$) for that child node results from the search phase. Or, a child vertex can itself be an internal vertex, in which case the new set of partial matches ($\delta_k$) for that child vertex results from an earlier join between sets of partial matches for its child vertices.

The network analysis tool handles (lines 5-7) the case in which the root of the SJ tree has been reached by returning a complete match.

Otherwise, for each of the child vertices, respectively, of the internal vertex, the network analysis tool performs (lines 8-17) a join operation between the new set of partial matches for the child vertex and a cumulative set of partial matches for its sibling vertex. The network analysis tool gets (line 8) the old set of partial matches (denoted $M_{left}$) for the left child vertex and gets (line 9) the old set of partial matches (denoted $M_{right}$) for the right child vertex. The network analysis tool also gets (lines 10-11) the new set of partial matches ($\delta_{left}$) for the left child node and gets (line 12) the new set of partial matches ($\delta_{right}$) for the right child node. The new set of partial matches ($\delta_{left}$) for the left child node can be a new set of partial matches for a leaf vertex at the bottom left of the SJ tree or sub-branch, or it can be a new set of partial matches for an internal vertex calculated in an earlier iteration. The network analysis tool determines (lines 13, 15) the cumulative set of partial matches ($M'_{left}$) for the left child vertex as the set union of the old set of partial matches ($M_{left}$) and new set of partial matches ($\delta_{left}$) for the left child vertex. The network analysis tool also determines (lines 14, 16) the cumulative set of partial matches ($M'_{right}$) for the right child vertex as the set union of the old set of partial matches ($M_{right}$) and new set of partial matches ($\delta_{right}$) for the right child vertex. Finally, the network analysis tool calculates (line 17) a new set of partial matches for the internal vertex (designated as the new $\delta_{left}$) as the set union between (a) results of a subgraph join between the new set of partial matches ($\delta_{right}$) for the right child vertex and the cumulative set of partial matches ($M'_{left}$) for the left child vertex, and (b) results of a subgraph join between the new set of partial matches ($\delta_{left}$) for the left child vertex and the cumulative set of partial matches ($M'_{right}$) for the right child vertex. The subgraph join can be implemented with parallel hash join operations using the example process (802) shown in FIG. 8b.

Figure 9:
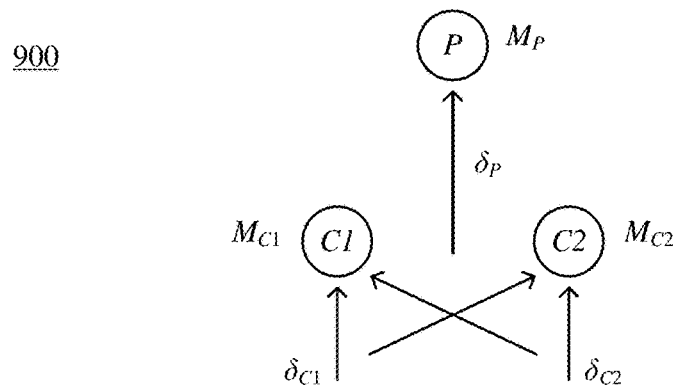
FIG. 9 is a diagram illustrating an example of updates to an SJ tree.

FIG. 9 graphically depicts an example (900) of updates to an internal vertex (P) at one level of an SJ tree. The internal vertex has two child vertices (C1 and C2). For the first child vertex (C1), its new set of partial matches ($\delta_{C1}$) is combined with its old set of partial matches ($M_{C1}$) to produce a cumulative set. For the second child vertex (C2), its new set of partial matches ($\delta_{C2}$) is combined with its old set of partial matches ($M_{C2}$) to produce a cumulative set. The new set of partial matches ($\delta_{C1}$) for the first child vertex is joined with the cumulative set of partial matches for the second child vertex. Concurrently, the new set of partial matches ($\delta_{C2}$) for the second child vertex is joined with the cumulative set of partial matches for the first child vertex. The union of the join operations produces a new set of partial matches ($\delta_P$) for the internal vertex (P), which may be subsequently combined with the old set of partial matches ($M_P$) for the internal vertex (P). This process can repeat iteratively for the internal vertex (P) as a new child vertex at the next higher level of the SJ tree.

In some cases, operations explained with reference to FIG. 8a can be performed in parallel with different processing cores. For example, operations performed to get new sets of partial matches or operations performed to determine cumulative sets of partial matches can be performed in parallel for different sibling vertices. As another example, operations performed for different sub-branches of the SJ tree may be performed in parallel, so long as there are no dependencies between the sub-branches.

With reference to FIG. 8b, the example process (802) accepts as inputs two sets ($M_1$, $M_2$) of partial matches and produces a new set ($M_{out}$) of partial matches. For example, the two input sets of partial matches can be a new set of partial matches ($\delta_{right}$) for a right child vertex and a cumulative set of partial matches ($M'_{left}$) for a left child vertex. Or, the two input sets of partial matches can be a new set of partial matches ($\delta_{left}$) for a left child vertex and a cumulative set of partial matches ($M'_{right}$) for a right child vertex.

The example process (802) uses a map-reduce approach with three phases: map, shuffle, and reduce. In the map phase (lines 2-5), input partial matches are processed one partial match at a time. This allows different input partial matches to be processed by different processing cores, creating an opportunity for massive parallelization. In lines 2-3, key-value pairs for the respective input partial matches in the first input set ($M_1$) are inserted into a sequence (H) of key-value pairs. For a given input partial match, the key is a hash value of the join predicate of the input partial match, and the value is a tuple that includes the input partial match and an indication ("true") that it is from the first input set ($M_1$). In lines 4-5, key-value pairs for the respective input partial matches in the second input set ($M_2$) are inserted into the sequence (H) of key-value pairs. For a given input partial match, the key is a hash value of the join predicate of the input partial match, and the value is a tuple that includes the input partial match and an indication ("false") that it is from the second input set ($M_2$). Each processing core performing map operations, also known as a mapper, emits a sequence of key-value pairs, which are then passed to the shuffle phase. For the map phase, different instances of tasks are executable in parallel for different partial matches of the two input sets of partial matches (that is, for a given new set of partial matches and the corresponding cumulative set of partial matches).

The shuffle phase is a synchronization step. In the shuffle phase (line 6), the network analysis tool aggregates the key-value pairs to produce groups of the key-value pairs organized by key. For example, the network analysis tool can collect all of the key-value pairs emitted by mappers, group key-value pairs with the same key together, and send different groups to different nodes. Subsequent operations for different groups (associated with different keys) can be performed in parallel on different nodes, since operations on tuples with one key are independent of operations on tuples with a different key.

In the reduce phase (lines 7-20), the network analysis tool processes the tuples of the key-value pairs for the respective groups to produce the new set ($M_{out}$) of partial matches. For a given group g, the network analysis tool gets (line 8) the tuples for the group from the sequence (H) and sets (lines 9-10) two lists to be empty. The network analysis tool appends (lines 11-15) each of the tuples into one of the two list $L_1$ and $L_2$, depending on whether the tuple is from the first input set ($M_1$) or second input set ($M_2$). Then, at lines 16-20, for each pair-wise combination of input partial match ($m_1$) for a tuple in the first list ($L_1$) and input partial match ($m_2$) for a tuple in the second list ($L_2$), the network analysis tool performs a subgraph join operation between the input partial matches $m_1$ and $m_2$ to produce an output partial match ($m_{out}$), which is added to the new set ($M_{out}$) of partial matches. For the reduce phase, different instances of tasks are executable in parallel for different groups among the groups of the key-value pairs.

Partial matches can be found at successively higher levels of the SJ tree. In this way, the network analysis tool can potentially find one or more complete matches of the query graph within the data graph.

In the preceding examples, operations are conducted in parallel to find partial matches for query subgraphs of a single query graph in a dynamic data graph. A network analysis tool can also conduct operations in parallel for different query graphs/SJ trees. In this case, the network analysis tool may be able to leverage locality in terms of operations. For example, if the network analysis tool can identify a common query subgraph between two or more SJ trees (for different query graphs), it can effectively search once for all of the two or more SJ trees. The network analysis tool can also leverage locality in terms of data. For example, the network analysis tool can identify a region of the data graph that applies for multiple searches for query subgraphs and track/manage that region once for multiple queries.

VII. Performance Enhancements for Distributed Continuous Subgraph Matching Queries on Graph-Structured Data This section describes innovative features of continuous subgraph matching queries on graph-structured data in a distributed architecture. The innovative features enable efficient continuous subgraph matching queries as updates arrive for arbitrarily large data sets organized as graph-structured data in various scenarios (e.g., social media relation tracking, network traffic analysis). In some example implementations, results of searching for matches of a query graph (and its query subgraphs) can be provided in a continuous, near-real time manner.

Figure 10:
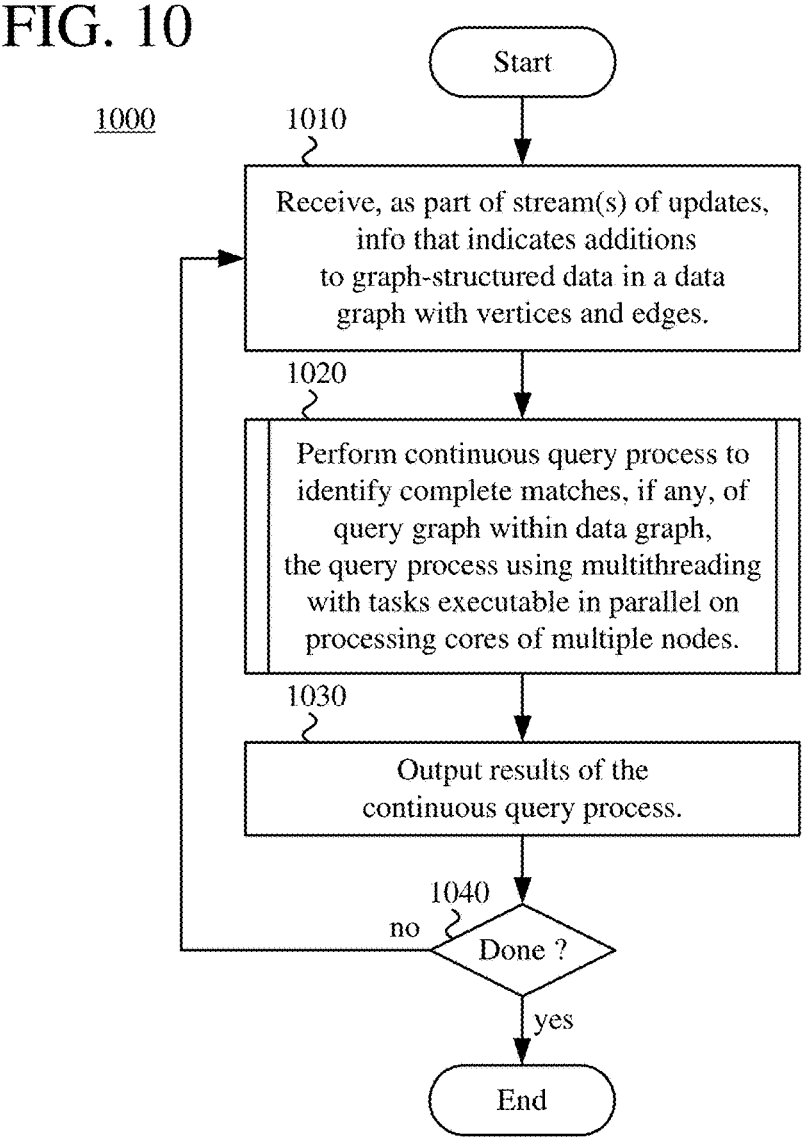
FIG. 10 is a flowchart illustrating a generalized technique for execution of continuous subgraph matching queries on graph-structured data.

FIG. 10 shows a generalized technique (1000) for execution of continuous subgraph matching queries on graph-structured data. The generalized technique (1000) can be performed by a network analysis tool as described in the preceding sections, or by another network analysis tool. FIGS. 11 and 11b show example continuous query processes (1100, 1150) that may be performed during one stage of the execution of continuous subgraph matching queries shown in FIG. 10.

The generalized technique (1000) is performed in a computer system with multiple nodes. Each of the nodes includes multiple processing cores and memory addressed according to a global address space. The multiple nodes can be organized according to the architecture shown in FIG. 6 or another architecture. In any case, the multiple nodes, collectively, are configured to perform operations for the continuous subgraph matching queries to find partial matches of query subgraphs of a query graph within a data graph.

With reference to FIG. 10, the network analysis tool receives (1010), as part of one or more streams of updates, information that indicates additions to a data graph (graph-structured data). The data graph includes vertices and edges between the vertices. The information that is received is can define updates to a data graph in any of various use case scenarios.

For example, the information that indicates the additions to the data graph is received as part of one or more streams of updates from one or more network traffic monitors. In this case, the query graph can represent a target pattern of intrusion or attack in a computer network, the vertices of the data graph can represent network entities such as machines, IP addresses, services, and/or applications, and the edges of the data graph can represent communications between the network entities. The vertices and edges of the data graph may have attributes provided by the network traffic monitors or other sources.

Alternatively, the information that indicates the additions to the data graph is received as part of one or more streams of updates from one or more event monitors for a social media network. In this case, the query graph can represent a target pattern of relationships in the social media network, the vertices of the data graph can represent social media entities such as users, services, and/or items, and the edges of the data graph can represent relationships between the social media entities. The vertices and edges of the data graph may have attributes provided by the event monitors or other sources.

Or, the information that indicates the additions to the data graph is received as part of one or more streams of updates from one or more link monitors for a link network. The query graph can represent a target pattern of links in a set of documents, the vertices of the data graph can represent the respective documents such as Web pages, blog posts, etc., and the edges of the data graph can represent links between the documents. The vertices and edges of the data graph may have attributes provided by the link monitors or other sources.

The network analysis tool performs (1020) a continuous query process to identify complete matches, if any, of a query graph within the data graph. The continuous query process uses multithreading with tasks executable in parallel on at least some of the processing cores of the multiple nodes. The continuous query process can be performed as described with reference to FIG. 11a, performed as described with reference to FIG. 11b, or performed in some other way described herein.

In general, as part of the continuous query process, the network analysis tool adds the edges to the data graph. The network analysis tool can also add vertices to the data graph. The continuous query process can include pruning the data graph to remove one or more edges and/or one or more vertices of the data graph. For example, the network analysis tool determines which of the edges of the data graph are outside a time window defined by a pruning threshold, which depends on implementation. In this case, the pruning can remove any of the edges of the data graph that are outside the time window defined by the pruning threshold. As another example, the network analysis tool determines which of the vertices of the data graph are attached to none of the edges of the data graph. In this case, the pruning can remove any of the vertices of the data graph that are attached to none of the edges of the data graph.

The network analysis tool also outputs (1030) results of the continuous query process. The results of the continuous query process can include complete matches, if any, of the query graph within the data graph and/or new sets of partial matches for query subgraphs within the data graph. For example, the network analysis tool outputs (1030) the results to a visualization tool.

The network analysis tool checks (1040) whether to continue the execution of continuous subgraph matching queries. If so, the network analysis tool receives, as part of the stream(s) of updates, another batch of information that indicates additions to the data graph and performs the continuous query process for the new batch of updates.

A. Innovations for Conditional Searching in a Distributed Architecture.

Lazy searching in a distributed architecture is complicated by parallel searching operations performed with different processing cores at the same node or different nodes. Although the identity of a top-selectivity query subgraph may be the same for all of the parallel searching operations, the decision about whether to search for a triggered query subgraph (in the area of a previous partial match for another query subgraph) depends on status information for vertices in the neighborhood of a new edge in the data graph.

In some example implementations, at a given node that participates in the parallel searching, a search control data structure in local memory tracks, for the vertices of the data graph, if partial matches have been found for the respective query subgraphs. For example, for each given vertex of the data graph, the search control data structure includes, for each of the query subgraphs, a value that indicates whether a partial match (including the given vertex) has been found for that query subgraph. The search control data structure is replicated in local memory at other nodes of the distributed architecture. Updates indicating new partial matches are exchanged between the nodes, such that each of the nodes includes an identical version of data in the search control data structure, after updates are processed. For example, when a thread on a processing core at a given node searches for the top-selectivity query subgraph and any triggered query subgraph, if a partial match is found, values for vertices in the partial match are updated in the search control data structure in local memory at the given node. The partial match event is also reported to other nodes, which update their versions of the search control data structure. At the respective nodes, changes to the search control data structure can trigger new query subgraphs to be searched in the lazy search process.

Alternatively, the search control data structure can be stored in global memory. For example, the search control data structure is stored, at different nodes, in memory addressed according to a global address space. The match status information for a given vertex can be stored in association with other information (e.g., an adjacency list) for the given vertex.

In various circumstances (e.g., if the top-selectivity query subgraph is not chosen carefully, or if the time window for partial matches is too long), the number of partial matches can mushroom. This can prolong the lazy search process, as new query subgraph searches are triggered. To manage the lazy searching process, the network analysis tool can further limit which edges and vertices are searched.

FIG. 11a shows an example continuous query process (1100) in which a network analysis tool conditionally performs search operations for one or more query subgraphs in a data graph. The example continuous query process (1100) is an example of the continuous query process described with reference to FIG. 10.

With reference to FIG. 11a, the network analysis tool updates (1110) the data graph based on the additions to the data graph. This adds new edges to the data graph. In the distributed architecture, different instances of tasks are executable in parallel to make updates for different batches of additions to the data graph, with each batch including one or more of the additions to the data graph. Batches of additions can be distributed to different nodes in various ways. For example, the total count of additions is divided by the total count of nodes in order to determine the size of a batch to be distributed to each node. Or, the total count of additions is divided by the total count of processing cores available for update operations in order to determine the batches to be distributed to the respective nodes (which also depend on the counts of processing cores for the respective nodes). When updating the data graph, the network analysis tool (or, more specifically, a worker thread) can use a lock mechanism as described in section VI to update edge information for a vertex in a thread-safe manner.

The network analysis tool conditionally searches (1120), based at least in part on evaluation of a condition, for new sets of partial matches of query subgraphs of the query graph at the new edges of the data graph. For the conditional searching (1120), different instances of tasks are executable in parallel to search at different edges of the new edges of the data graph. In some example implementations, the conditional searching (1120) follows a "lazy searching" approach. The network analysis tool searches, at the new edges of the data graph, for partial matches of only a top-selectivity query subgraph and any other query subgraph (among the query subgraphs of the query graph) that furthers progress of a previous partial match towards completion of a complete match. If a partial match is found in this searching, the network analysis tool continues by searching, at neighboring edges of the data graph, for any of the query subgraphs that furthers progress of the new partial match towards completion of a complete match. Alternatively, the conditional searching (1120) can include searching, at the new edges, for partial matches of each unique query subgraph among the query subgraphs of the query graph.

For the conditional searching (1120), the condition depends on vertex-level summary metadata for at least some of the vertices of the data graph. The vertex-level summary metadata can include various types of information, such as indicators of temporal activity, indicators of range of relations, indicators of updates within a time window defined by a search threshold, and/or other indicators for vertices. The vertex-level summary metadata can be stored in global memory in conjunction with the data graph at different nodes of the distributed architecture. Alternatively, the vertex-level summary metadata can be stored in local memory and replicated at different nodes of the distributed architecture.

In some example implementations, the vertex-level summary metadata includes indicators of temporal activity. In this case, for a given new edge, the conditional searching (1120) can depend on whether, for vertices connected to the given new edge, corresponding ones of the indicators indicate at least a threshold level of activity at the vertices connected to the given new edge. Thus, the network analysis tool can check whether vertices have been updated frequently/regularly or in a burst of updates, and then decide whether to search for partial matches that include those vertices.

In some example implementations, the vertex-level summary metadata includes indicators of range of relations. In this case, for a given new edge, the conditional searching (1120) can depend on whether, for vertices connected to the given new edge, corresponding ones of the indicators indicate at least a threshold range of relations for the vertices connected to the given new edge. Thus, the network analysis tool can check diversity scores for vertices, and then decide whether to search for partial matches that include those vertices. The diversity score for a vertex can indicate the number of attributes satisfied at the vertex, for a given query. More generally, the diversity score can capture a range of relations that have been satisfied, in a query-specific way or in a way that applies for multiple different queries.

In some example implementations, the vertex-level summary metadata includes indicators of updates within a time window defined by a search threshold. In this case, for a given new edge, the conditional searching (1120) can depend on whether, for vertices connected to the given new edge, corresponding ones of the indicators indicate activity within the time window at the vertices connected to the given new edge. Thus, the network analysis tool can check whether recent updates to vertices (e.g., new edges) have occurred, and then decide whether to search for partial matches that include those vertices.

After the conditional searching (1120), the network analysis tool conditionally performs (1130) join operations between partial matches from the new sets of partial matches and partial matches from cumulative sets of partial matches. For the conditional performance (1130) of the join operations, the condition can depend on the vertex-level summary metadata. Or, the condition can be a different condition.

B. Innovations for Conditional Joins in a Distributed Architecture.

Join operations in a distributed architecture can be computationally expensive, even when operations are performed in parallel. As described with reference to FIGS. 8a, 8b, and 9, for two sets of partial matches, join operations potentially involve a large number of subgraph joins between pair-wise combinations of partial matches from the two sets of partial matches, as well as operations to map partial matches to key-value pairs (tuples), sort the key-value pairs into groups, and manage lists of partial matches. To limit the computational complexity of join operations, the network analysis tool can conditionally perform the join operations in a distributed architecture.

FIG. 11b shows an example continuous query process (1150) in which a network analysis tool conditionally performs join operations between sets of partial matches. The example continuous query process (1150) is an example of the continuous query process described with reference to FIG. 10.

With reference to FIG. 11b, the network analysis tool updates (1110) the data graph based on the additions to the data graph, as described with reference to FIG. 11a. This adds new edges to the data graph. In the distributed architecture, different instances of tasks are executable in parallel to make updates for different batches of additions to the data graph.

The network analysis tool searches (1170) for new sets of partial matches of query subgraphs of the query graph at the new edges of the data graph. For the searching (1170), different instances of tasks are executable in parallel to search for different edges of the new edges of the data graph. The searching (1170) can use a lazy searching approach or full search approach (searching, at the new edges, for partial matches of each unique query subgraph among the query subgraphs of the query graph). The searching (1170) can be performed conditionally, as described with reference to FIG. 11a.

Then, based at least in part on evaluation of a condition, the network analysis tool conditionally performs (1180) join operations between partial matches from the new sets of partial matches and partial matches from cumulative sets of partial matches. The condition is whether affected vertices of the data graph for the partial matches from the cumulative sets have been updated within a time window defined by a join threshold. The join threshold depends on implementation. Per-vertex information that indicates whether the respective vertices of the data graph have been updated within the time window can be stored in global memory at different nodes (e.g., in conjunction with other information for the respective vertices). Or, such per-vertex information can be stored in local memory (and replicated) at different nodes.

For example, for a given partial match from one of the cumulative sets of partial matches, to evaluate the condition, the network analysis tool determines whether the affected vertices for the given partial match have been updated within the time window defined by the join threshold. The affected vertices of the given partial match can be a subset (e.g., join predicate) of the vertices of the given partial match. Or, the affected vertices can be all of the vertices of the given partial match. Depending on implementation, the condition can be satisfied if at least one of the affected vertices has been updated within the time window, or satisfied only if all of the affected vertices have been updated within the time window. If affected vertices for the given partial match have been updated within the time window defined by the join threshold, the network analysis tool performs a join operation (e.g., subgraph join) between the given partial match and a partial match from one of the new sets of partial matches. Otherwise, the network analysis tool skips the performing that join operation.

For a given query subgraph in an SJ tree, the new set of partial matches can be empty, include a single new partial match, or include multiple new partial matches. Similarly, the cumulative set of partial matches for a given query subgraph in the SJ tree can be empty, include a single partial match, or include multiple partial matches.

In some example implementations, an SJ tree includes one or more internal vertices and multiple leaf vertices for query subgraphs of a query graph. Each of the leaf vertices of the SJ tree has an old set of partial matches for one of the query subgraphs. The old set of partial matches can be empty, include a single partial match, or include multiple partial matches. As part of the query process, for each given leaf vertex of the SJ tree, the network analysis tool adds a new set of partial matches for the leaf vertex to the old set of partial matches for the leaf vertex, thereby producing a cumulative set of partial matches. For example, the network analysis tool calculates cumulative sets of partial matches as described with reference to FIG. 8a. For a given internal vertex of the SJ tree (having first and second child vertices), the network analysis tool conditionally performs join operations between partial matches from the new set of partial matches for the first child vertex and partial matches from the cumulative set of partial matches for the second child vertex. For example, the network analysis tool checks the condition of affected vertices before operations in line 17 in FIG. 8a, and filters the cumulative sets of partial matches ($M'_{left}$, $M'_{right}$) to remove those partial matches with affected vertices not updated within the time window. In this way, the network analysis tool potentially passes smaller cumulative sets of partial matches to the parallel hash join function shown in FIG. 8b.

As described with reference to FIG. 8b, to perform the join operation between a given new set of partial matches and corresponding cumulative set of partial matches (for a sibling vertex), the network analysis tool maps (map phase) at least some of the given new set of partial matches and at least some of the corresponding cumulative set of partial matches to a sequence of key-value pairs. For the map phase, different instances of tasks are executable in parallel to calculate key-value pairs for different partial matches of the new set of partial matches and corresponding cumulative set of partial matches. If the condition (for the conditional performance of join operations) is not evaluated before operations in line 17 of FIG. 8a, the condition of affected vertices can be evaluated before the map phase (e.g., before operations of line 2 of FIG. 8b) or during the map phase (e.g., interleaved with operations in lines 2-5 of FIG. 8b). In this way, the network analysis tool can filter the input set of partial matches ($M_1$ or $M_2$) that corresponds to the cumulative set of partial matches in order to remove those partial matches with affected vertices not updated within the time window.

As described with reference to FIG. 8b, the network analysis tool then aggregates (shuffle phase) the key-value pairs to produce groups of the key-value pairs organized by key, and reduces (reducing phase) the respective groups of key-value pairs. For the reduce phase, different instances of tasks are executable in parallel for different groups of the key-value pairs. If the condition (for the conditional performance of join operations) has not yet been evaluated, the condition of affected vertices can be evaluated during the reducing phase (e.g., before line 8, before line 9, or before line 16 of FIG. 8b). In this way, the network analysis tool can eliminate partial matches with affected vertices not updated within the time window, thereby avoiding subgraph joins that involve those partial matches (at line 18).

Thus, with one or more worker threads, the network analysis tool selectively updates the SJ tree. With reference to FIG. 9, for an internal vertex (P) of the SJ tree, a worker thread need not compare every new partial match (in $\delta_{C1}$) from a child vertex (C1) against every cumulative partial match (in $M_{C2}$) from its sibling vertex (C2). Similarly, a worker thread need not compare every new partial match (in $\delta_{C2}$) from the other child vertex (C2) against every cumulative partial match (in $M_{C1}$) from its sibling vertex (C1). Instead, the worker thread(s) can compare new partial matches of a child vertex against a subset of the cumulative partial matches from its sibling vertex, with the subset being determined based on which vertices of the data graph have been recently updated.

VIII. Usability Enhancements for Query Graph Construction

A query graph can be designed in various ways. For example, a query graph (and associated SJ tree) can be designed using a specification language similar to SQL or SPARQL, which allows a user to specify vertices, edges, attributes, SJ tree partitions, and various constraints for the query graph. In text form, the specification of a query graph can be verbose and complicated, which makes it difficult for users to specify query graphs.

This section describes features of a query graph building tool that can be used to create a query graph in an intuitive, graphical manner, for use in execution of continuous subgraph matching queries on graph-structured data. The building tool uses a library of templates for different patterns of query graphs. The library can include templates for common patterns of query graphs (by default) in a given use case scenario, as well as user-created templates for other patterns of query graphs. In general, a query graph includes vertices, attributes of the vertices, edges between the vertices, and attributes of the edges, and a query graph can be used in any of various use case scenarios.

For example, the query graph can represent a target pattern of intrusion or attack in a computer network. In this case, the vertices of the query graph can represent network entities such as machines, services, and/or applications. The edges of the query graph can represent communications between the network entities (e.g., message flow).

Alternatively, the query graph can represent a target pattern of relationships in a social media network. In this case, the vertices of the query graph can represent social media entities such as users, services, and/or items. The edges of the query graph can represent relationships between the social media entities.

Or, the query graph can represent a target pattern of links in a set of documents. In this case, the vertices of the query graph can represent the respective documents such as Web pages, blog posts, etc. The edges of the query graph can represent links between the documents.

In some example implementations, the query graph building tool is interactive in several respects. First, the building tool can react to user input to select a template, change various features of a query graph, save a query graph, and/or start the process of continuous subgraph matching queries using the query graph. Second, the building tool can react to changes in a dynamic data graph by adjusting options for attributes of vertices and/or edges of the query graph.

FIG. 12 shows a generalized technique (1200) for building a query graph from a template, for use in execution of continuous subgraph matching queries on graph-structured data. A query graph building tool as described with reference to FIG. 2, or other query graph building tool, can perform the technique (1200). The building tool can render and present, on a display screen, features of a user interface as illustrated with reference to FIGS. 13 and 14. Alternatively, the building tool uses different features of a user interface.

The building tool receives (1210) user input to create, change, save, or otherwise process a query graph. Various types of user input are described with reference to FIG. 2. The way that the building tool handles the user input depends on what the user input indicates.

The building tool checks (1220) if the user input indicates a selection, from a library of multiple available templates, of a template for a query graph. If so ("yes" branch from decision 1220), in response to the user input, the building tool loads (1222) the template for the query graph and renders for display graphical indications of the vertices of the query graph, their attributes, the edges of the query graph, and their attributes. In general, a template is a type or pattern of query graph, with at least some details (e.g., vertices, edges, default values of attributes) specified for the query graph in the template. Examples of templates are described below. Alternatively, the library includes other and/or additional templates.

Otherwise ("no" branch from decision 1220), the building tool checks (1230) if the user input indicates one or more changes to the query graph. If so ("yes" branch from decision 1230), the building tool changes (1232) the query graph based on the user input and renders for display graphical indications of the vertices, edges, attributes, etc. of the changed query graph.

In some example implementations, vertices and edges of a query graph are fixed (not changeable) for a template, but attributes of the vertices and/or edges can be specified. In response to the user input, the building tool can change one or more of the attributes of the vertices and/or one or more of the attributes of the edges of the query graph. In this way, after selecting a template for a query graph, the user can selectively populate the attributes of vertices and edges of the query graph.

In other example implementations, in addition to specifying attributes, a user can change the structure (vertices, edges) of the query graph. For example, in response to the user input, the building tool can add one or more new vertices, remove one or more vertices, add one or more new edges, remove one or more edges, reroute one or more edges, change one or more of the attributes of the vertices, and/or change one or more of the attributes of the edges of the query graph.

A given one of the attributes of the vertices or edges of the query graph can have a wildcard value, a specific value, or a range of values. Attributes of edges can define ordering requirements or other temporal constraints for the edges (e.g., defining an order of messages for the query graph or setting relative ordering requirements between messages for the query graph).

Returning to FIG. 12, following the "no" branch from decision 1230, the building tool checks (1240) if the user input indicates changes to query subgraphs of the query graph. If so ("yes" branch from decision 1240), the building tool generates (1242) new query subgraphs, consistent with the user input, organized as an SJ tree for the query graph. Thus, generation of the SJ tree can be guided by user input in some respects. In other respects, generation of the SJ tree is automatic. The building tool can use the query graph, including ordering details from attributes of edges, to generate a temporal layout of the query graph. Depending on user preferences, the building tool can traverse the temporal layout in a depth-first, breadth-first, or statistically-driven fashion to set partitions between query subgraphs and identify join predicates across the partitions. In the statistically-driven approach, the traversal is based on the most discriminant edges in the query graph, as indicated by historical or live training data. In some example implementations, the building tool can optimize the SJ tree for a query graph based on results (e.g., partial match characteristics, frequencies for query subgraphs) of using the query graph in execution of continuous subgraph matching queries on historical or live training data. Also, after a query graph is changed (operation 1232), the building tool can automatically generate (1242) new query subgraphs organized as an SJ tree for the changed query graph.

Following the "no" branch from decision 1240, the building tool checks (1250) if the user input indicates to save the query graph. If so ("yes" branch from decision 1250), the building tool saves (1252) the query graph, including query subgraphs organized as an SJ tree.

Otherwise ("no" branch from decision 1250), the building tool handles (1260) the user input in some other way. For example, the user input can specify which of the query subgraphs is to be searched first during a continuous query process (e.g., for a "lazy searching" approach). In response, the building tool can change the SJ tree for the query graph and save, in association with the SJ tree, an indication of which of the query subgraphs is to be searched first during the continuous query process. Or, the user input can specify that continuous subgraph matching queries should be started for the query graph. In response, the building tool can pass the query graph (and SJ tree) to a network analysis tool, which registers the query graph and begins continuous subgraph matching queries within a data graph.

After handling the user input, the building tool checks (1270) whether to continue the building process. If so, the building tool continues by receiving (1210) new user input to process.

As noted, the building tool can pass the query graph (and associated SJ tree) to a network analysis tool, which can perform continuous subgraph matching queries for the query graph within a dynamic data graph. The building tool (or an associated visualization tool) can present, on a display screen, results of searching for the query graph within the data graph. The results can indicate complete matches, if any, of the query graph as well as partial matches of one or more of the query subgraphs of the query graph. The presented results can also include statistics about which query subgraphs are most common. This can help a user identify "false positive" matches of query subgraphs that do not lead to complete matches.

In response to the display of results, the building tool can receive (1210) additional user input. For example, the additional user input can indicate one or more new changes to the query graph. In response, the building tool can change (1232) the query graph. Or, as another example, the additional user input can change which of the query subgraphs is to be searched first during a continuous query process (e.g., for a "lazy searching" approach). In response, the building tool can change the SJ tree for the query graph and adjust the indication of which of the query subgraphs is to be searched first during the continuous query process. Thus, a user can modify the SJ tree so that a rare query subgraph that is likely to lead to a complete match is searched first in a "lazy searching" approach, and resources are not spent tracking partial matches of common query subgraphs unlikely to signify the emergence of a complete match. In this way, the query graph can be made more selective and helpful to the user.

In some example implementations, for a dynamic data graph, the building tool automatically populates values of attributes of vertices and/or edges of the query graph in the user interface of the building tool, based on contents of the dynamic data graph as it changes. For a user, this can simplify the process of adapting the query graph to suit the data graph.

The building tool can be distributed between multiple nodes in a distributed architecture. For example, a query graph can be constructed using an application that executes in a Web browser environment, then submitted to a Web server for registration and use in continuous subgraph matching queries. The continuous subgraph matching queries can be executed in a distributed manner using a cluster of nodes, as explained in previous sections. The Web server can provide results of the queries back to the Web browser, for presentation in the Web browser environment as feedback to the user, who may adjust the query graph.

Figure 13:
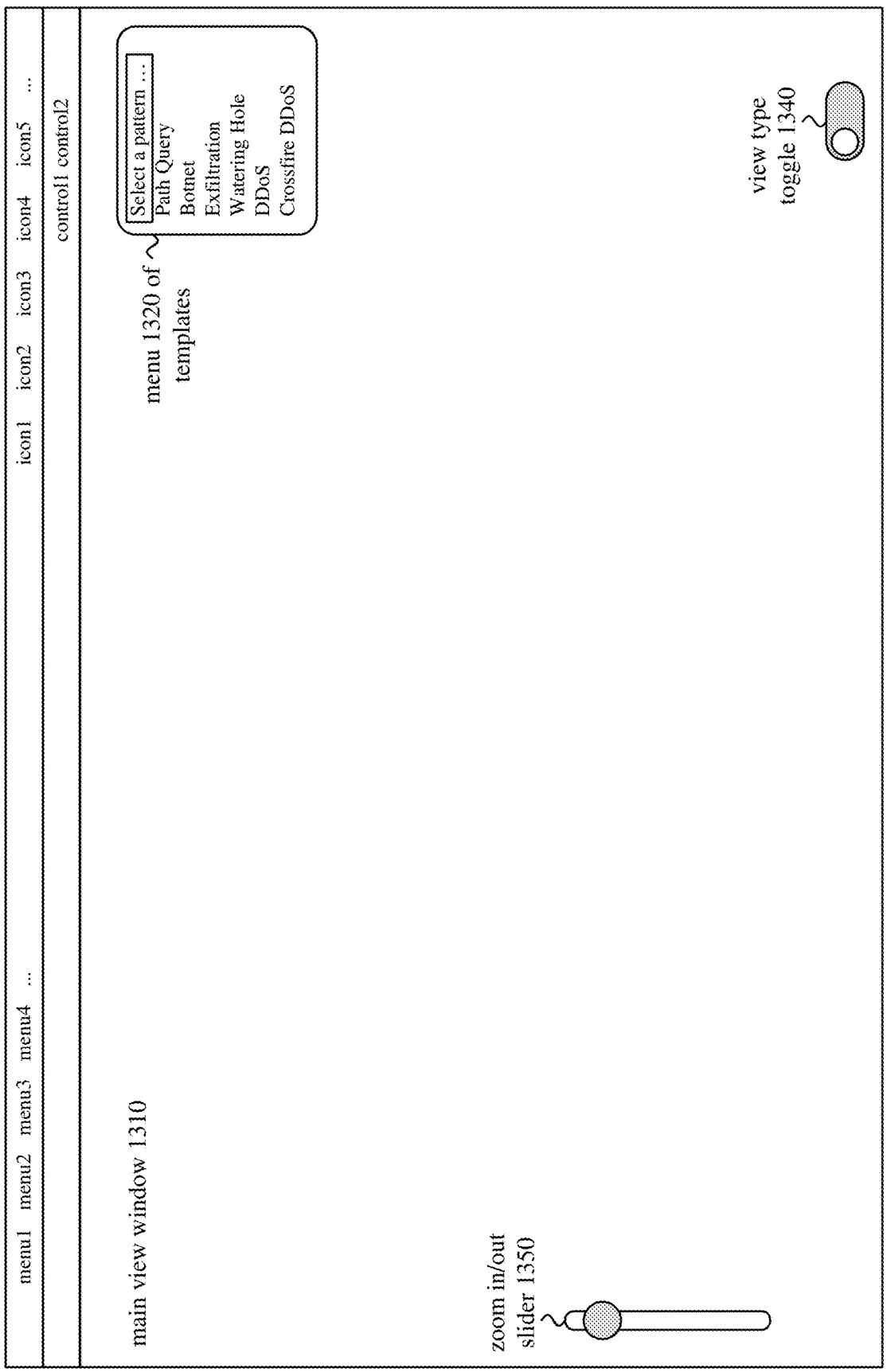
FIGS. 13 and 14 are diagrams illustrating features of a user interface for an example query graph building tool.

FIG. 13 shows features of a user interface (1300) for an example query graph building tool/visualization tool. The user interface (1300) includes a main view window (1310) in which results of continuous subgraph matching queries can be displayed, a zoom in/out slider (1350), and a view type toggle (1340), which can be used to switch between an abstract view and geo-spatial view. The user interface also includes a menu (1320) of templates for query graphs. In FIG. 13, the menu shows options for the use case scenario of computer network security. The options include query graphs for various types of network intrusions and attacks, including Path Query, Botnet (command and control), Exfiltration, Watering Hole, DDoS, and Crossfire DDoS. Other available templates (not shown) can include templates for Witty Worm, Smurf DDoS, Fraggle DDoS, DNS amplification DDoS, and sequential attack vectors.

Figure 14:
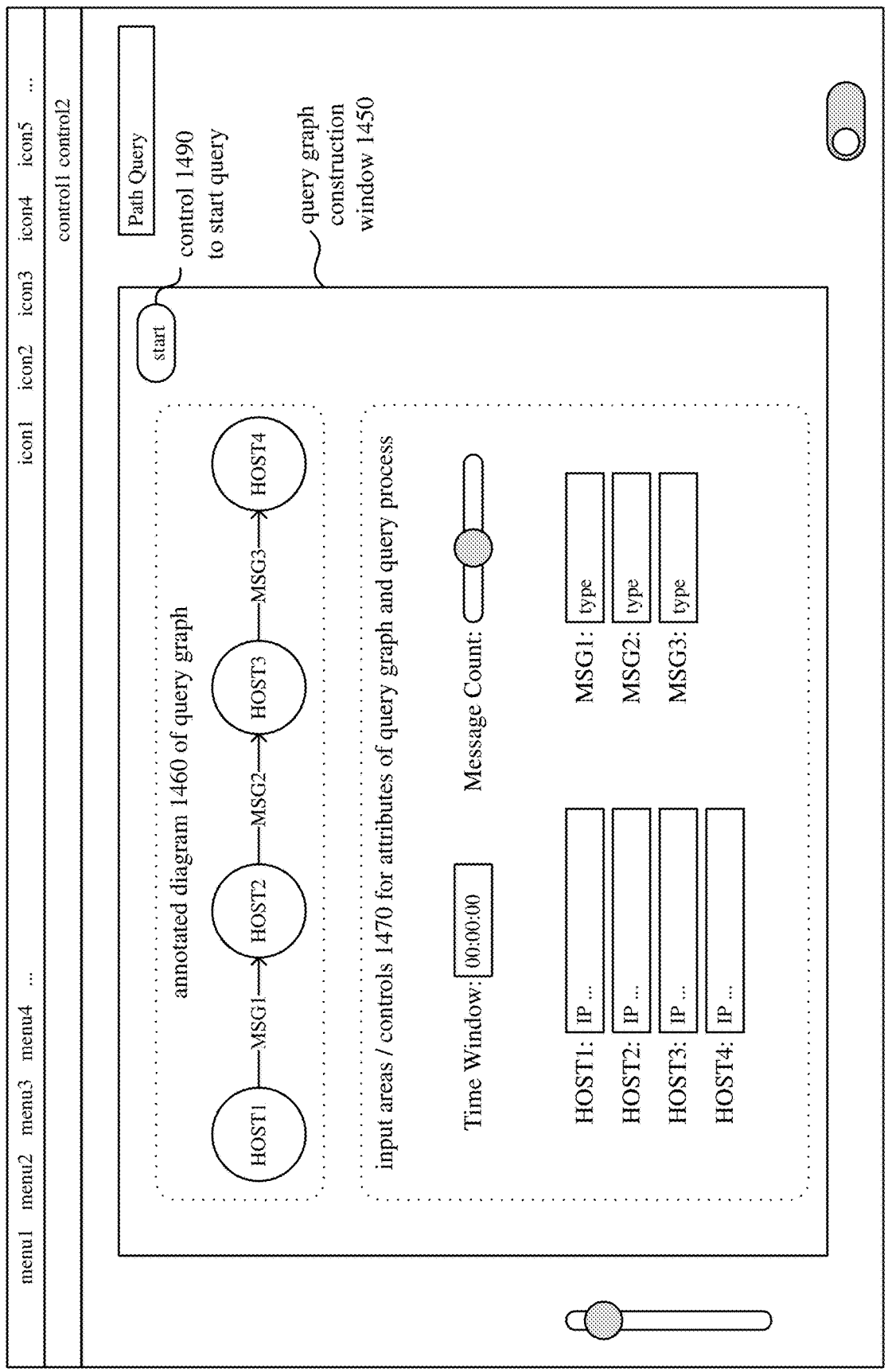

FIG. 14 shows features of a user interface (1400) for the example query graph building tool. The user interface (1400) includes a query graph construction window (1450) and control (1490). The query graph construction window (1450) includes an annotated diagram (1460) and input areas/controls (1470). The control (1490) can be actuated to pass the query graph shown in the query graph construction window (1450) to a network analysis tool and cause the network analysis tool to start the continuous query process using the query graph and a data graph (specified elsewhere).

The annotated diagram (1460) shows the query graph for a selected template, which is the Path Query template in FIG. 14. The annotated diagram (1460) depicts vertices and edges of the query graph. The annotated diagram (1460) can show roles or labels of the vertices and edges (e.g., HOST1, HOST2, MSG1, MSG2, ATTACKER, CONTROLLER, BOT MASTER, BOT). A value of an attribute of a vertex or edge of the query graph (whether default value or user-specified value) can be shown in the annotated diagram (1460) next to the vertex or edge.

In FIG. 14, the annotated diagram (1460) shows four vertices, which are associated with host machines having host addresses, and three edges, which are associated with messages. The input areas/controls (1470) show default values for attributes of the query graph and settings for the continuous query process. The settings for the continuous query process include a time window (which can be set to a duration in hours, minutes, and seconds) and message count. For the query graph shown in the annotated diagram (1460), the user can set an IP address for each of the four host machines associated with vertices. By default, the IP address can be any IP address (wildcard). To specify a range of IP addresses, the IP address can be specified using a subnet mask. The user can set the message type for each of the three messages associated with edges.

For other templates, the query graph has different vertices and edges, and the attributes for vertices and edges can change depending on the template. A given vertex can have a single attribute or a combination of multiple attributes. For example, the attributes for a vertex can include label, host name, host address (e.g., IP address), machine type, address type, and/or port number. An attribute such as host address or port number can be specified as a range. The attributes for an edge can include protocol (e.g., HTTP), packet length, packet count, message type (e.g., ICMP echo request, ICMP echo reply, DNS query), timestamp, and/or temporal order within the query graph (relative to other edges of the query graph). An attribute such as packet length, packet count, or timestamp can be specified as a range. With the temporal order attribute, a user can define the target chronological order of messages associated with edges.

For a specific type of network intrusion or attack, the template can permanently set (fix) the structure (vertices and edges) of the query graph while allowing the user to specify attributes of vertices and edges. FIG. 14 shows an example of this approach. For another type of network intrusion or attack, the user can also vary the "scale" of the query graph, by adjusting the number of internal patterns in the query graph. For example, in a Botnet query graph, the user can specify the number of "bots" for the query pattern (e.g., >20, >50). In other cases, the user is allowed to arbitrarily adjust edges and/or vertices of the query graph. Also, in some examples, the value of an attribute of a vertex or edge of a query graph may be fixed (not changeable) according to a template. Typically, however, attributes can be changed.

FIG. 14 shows input areas (1470) for attributes. Alternatively, the value of an attribute can be set with a pick-list menu, dialog box, or other type of user interface control, which may be activated by selection of the control or other indicator that is visually associated with the attribute in the user interface of the building tool. In some example implementations, when a vertex or edge is selected by the user in the annotated diagram (1460), the user interface presents input areas/controls for the attributes of the selected vertex or edge. The current (or default) values of the attributes of the selected vertex or edge can be shown. The user can then change one or more of the attributes. When the user selects another vertex or edge in the annotated diagram (1460), the attributes of the previously selected vertex/edge are hidden. In other example implementations (as in FIG. 14), the user interface presents input areas/controls for the attributes of all of vertices and edges of the query graph.

When an attribute is specified for a vertex or edge of a query graph, the network analysis tool checks whether a vertex or edge in a data graph satisfies the attribute during subgraph pattern matching. If the attribute of the query graph is an exact value, the network analysis tool checks whether the attribute of the vertex or edge in the data graph exactly matches the attribute of the corresponding vertex or edge in the query graph. If the attribute of the query graph is a range, the network analysis tool checks whether the attribute of the vertex or edge in the data graph falls within the range of the attribute of the corresponding vertex or edge in the query graph. If the attribute of the query graph is the wildcard value or is not specified, the attribute of the vertex or edge in the data graph always matches the attribute of the corresponding vertex or edge in the query graph.

IX. Usability Enhancements for Match and Progress Visualization

Results of subgraph query matching can be visualized in various ways. This section describes features of a results visualization tool that presents results of continuous subgraph matching queries on graph-structured data. According to the new visualization approach, significant early stage results can be presented in context as the underlying data in a data graph dynamically changes.

In a match graphic rendered by the visualization tool, partial matches at key vertices and edges of a dynamic data graph can be emphasized in early stages of continuous subgraph matching queries on graph-structured data. That is, a partial match can be emphasized before a complete match has been found. In particular, partial matches for rare, high-selectivity query subgraphs can be emphasized in the user interface by the visualization tool at early stages, which may indicate the emergence of a complete match or the start of another significant event. In some example implementations, partial matches (especially rare ones) are graphically highlighted in a different color (e.g., brighter color) or heavier lines in order to accentuate differences compared to underlying data in the dynamic data graph.

At the same time, context for partial matches is presented. The underlying data graph can be graphically depicted as vertices and edges that connect the vertices. In this graphical arrangement, a partial match can be graphically highlighted as described above (e.g., different color and/or heavier lines). As a partial match becomes more complete (by merger of partial matches for different query subgraphs), the higher-level partial match can be further emphasized (e.g., made brighter and/or heavier). In some example implementations, a partial match changes to a uniform, distinctive color as the partial match becomes a complete match. As partial matches "age out," they can be deemphasized (e.g., made less bright and/or narrower, or "written over" by newer vertices/edges).

The visualization tool can be used in any of various use case scenarios (e.g., computer network security, social media network analysis, link analysis), as described above.

Figure 15:
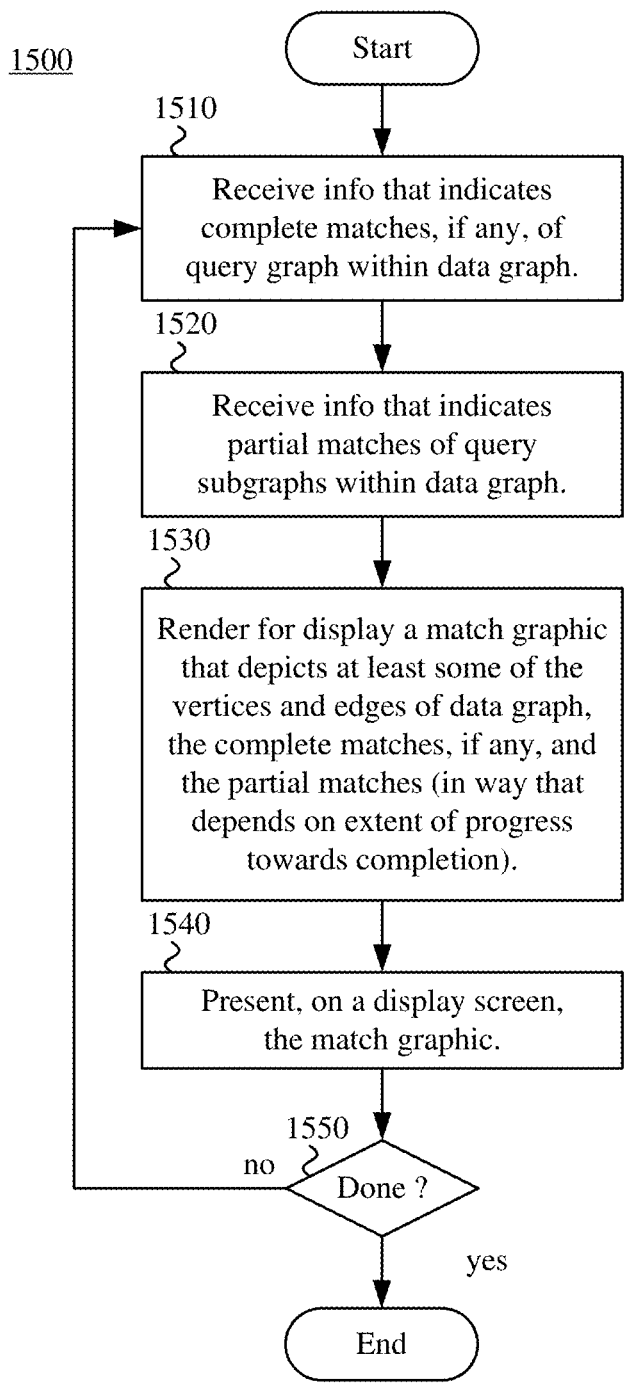
FIG. 15 is a flowchart illustrating a generalized technique for visualization of results with rendering of partial matches that depends on extent of progress towards completion, during execution of continuous subgraph matching queries on graph-structured data.

FIG. 15 shows a generalized technique (1500) for results visualization during execution of continuous subgraph matching queries on graph-structured data. A results visualization tool as described with reference to FIG. 2, or other results visualization tool, can perform the technique (1500). The visualization tool can render and present, on a display screen, features of a user interface as illustrated with reference to FIG. 16. Alternatively, the visualization tool uses different features of a graphical user interface.

According to the technique (1500), during execution of continuous subgraph matching queries on graph-structured data, the visualization tool renders results of searching for a query graph within the data graph. The data graph includes vertices and edges between the vertices. The query graph includes multiple query subgraphs. As part of the searching, a network analysis tool finds complete matches, if any, of the query graph within the data graph and also finds partial matches of query subgraphs within the data graph. As part of the visualization, the visualization tool renders partial matches in a way that depends on extent of progress (or maturity) towards completion.

With reference to FIG. 15, the visualization tool receives (1510) information that indicates complete matches, if any, of the query graph within the data graph. The visualization tool also receives (1520) information that indicates partial matches of the query subgraphs within the data graph. For example, a network analysis tool provides such information in the form of new sets of partial matches (or complete matches) for vertices of an SJ tree.

The visualization tool renders (1530) for display a match graphic that depicts (a) at least some of the vertices of the data graph, (b) at least some of the edges of the data graph, (c) the complete matches, if any, and (d) the partial matches. For the partial matches, the rendering depends on extent of progress (maturity) towards completion. It can also depend, at least in part, on selectivity of associated query subgraph. In some example implementations, the visualization tool lays out partial matches using a force-directed graph layout algorithm. Alternatively, the partial matches are laid out in some other way. The visualization tool presents (1540), on a display screen, the match graphic.

For example, for the partial matches, color in the match graphic depends on the extent of progress towards completion. In this way, the visualization tool can provide a contextualized "heat map" for the results of continuous subgraph matching queries. The "heat" of the heat map corresponds to the extent of matching of a query graph, with a "coolest" color indicating no matching query subgraphs and the "hottest" color indicating a complete match. Thus, a color gradient can indicate a "confidence" for the extent of match found so far.

In some example implementations, a user can select with user input (e.g., through a mouse or other pointing device) one of the vertices of the data graph depicted in the match graphic. In this case, the visualization tool can center the match graphic around the selected vertex, with edges flowing from the selected vertex to other, connected vertices of the data graph depicted in the match graphic. The selected vertex can be rendered in a different color than other, non-selected vertices. In the match graphic, partial matches that involve sets of edges and vertices can be depicted in a manner that depends on the extent of progress towards completion. The visualization tool can also render associated information for the selected vertex (e.g., one or more attributes of the selected vertex, a number of complete matches involving the selected vertex, a number of partial matches involving the selected vertex, a match score for the selected vertex). The associated information can be presented in a side area adjacent the match graphic or in a small area near the selected vertex, overlaying the match graphic.

In some example implementations, a user can actuate a control (such as the zoom in/out slider (1350) shown in FIG. 13) to zoom in or zoom out around the selected vertex. In this way, the visualization tool can render the immediate neighborhood around the selected vertex in more detail or render a progressively higher-level view of the data graph.

The visualization tool checks (1550) whether to continue the visualization process. If so, the visualization tool continues by receiving (1510, 1520) new information that indicates complete matches, if any, and partial matches. In this way, the visualization tool can repeat the operations shown in FIG. 15 as the data graph changes, new complete matches are found, new partial matches are found, and so on. New partial matches and new complete matches can be emphasized (e.g., by compositing them in a "top" layer of the match graphic). Over time, old complete matches and old partial matches can be de-emphasized in the user interface (e.g., by overwriting them with newer matches at higher layers and/or depicting them in a different color or narrower lines).

The user interface can also show a progress graph that depicts the SJ tree associated with the query graph. For example, the visualization tool renders for display a progress graphic that depicts vertices and edges of an SJ tree for the query graph. The progress graphic is a diagrammatic representation of the SJ tree. The rendering the progress graphic depends at least in part on counts of matches (partial matches or complete matches) for the vertices of the subgraph join tree. The visualization tool can then present, on the display screen, the progress graphic in conjunction with the match graphic.

For the vertices of the SJ tree, color and/or size of elements in the progress graphic can depend on the counts of the matches for the vertices of the SJ tree. For example, to indicate the frequency of partial matches for different query subgraphs in the progress graphic, the visualization tool can change the size and/or line weights for vertices and edges of the query graph. As partial matches are found more frequently for a query subgraph, the vertex for the query subgraph in the progress graphic can be depicted with a larger circle and/or heavier line. At the same time, the edges in the progress graphic can also be depicted with heavier lines. Thus, the progress graphic can indicate the number of partial matches occurring for the query subgraph of each of the non-root vertices of the SJ tree. The progress graphic can also indicate the number of complete matches occurring for the query graph of the root vertex of the SJ tree.

The colors of partial matches in the match graphic can track the colors of corresponding vertices of the SJ tree in the progress graphic. For example, partial matches for a given query subgraph are rendered in the match graphic in the same color as the vertex for the given query subgraph in the progress graphic for the SJ tree. The color can correspond to the level or degree of progress towards a complete match, or it can indicate a degree of selectivity (discriminatory power) for query subgraphs. Text indicating a matching score or percentage can also be shown for each vertex of the SJ tree in the progress graphic.

Figure 16:
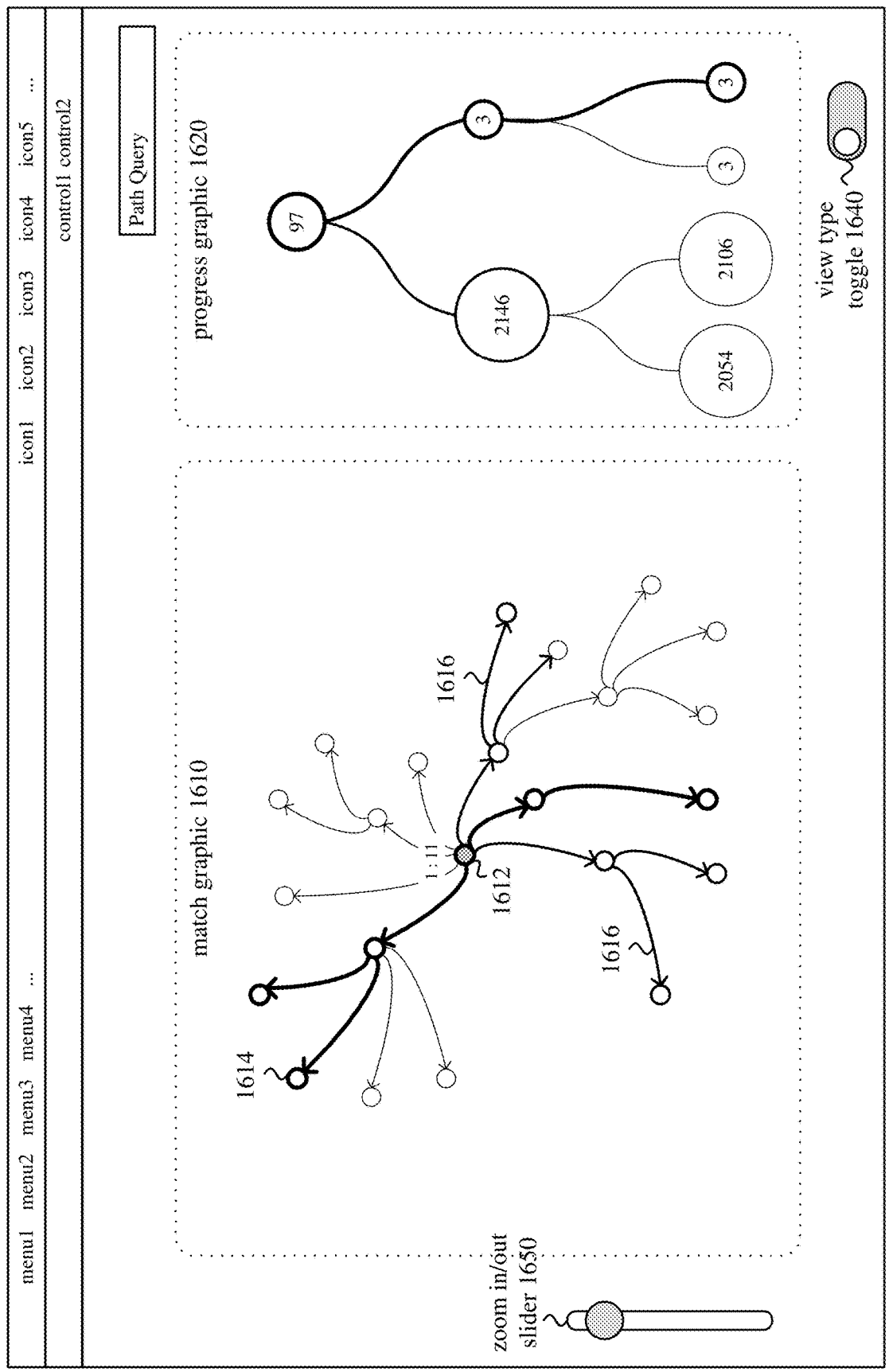
FIG. 16 is a diagram illustrating features of a user interface of an example results visualization tool.

The visualization tool can switch between an abstract view and geo-spatial view (e.g., depending on the view type toggle (1340) shown in FIG. 13 or view type toggle (1640) shown in FIG. 16). For the abstract view, vertices of the data graph are depicted in an abstract configuration, and can be reconfigured to focus on a selected vertex, as described above. For the geo-spatial view, the visualization tool composites at least some of the match graphic over a geo-spatial map view, such that the vertices of the data graph are depicted at different physical locations. This can help provide real-world context for the match graphic. For example, vertices that represent host machines having IP addresses can be rendered at or near the physical locations associated with those IP addresses. Information associated with the vertices can be depicted (e.g., one or more attributes of the respective vertices, number of complete matches involving the respective vertices, number of partial matches involving the respective vertices, match scores for the respective vertices). To show partial matches, the way that vertices and/or edges in the geo-spatial view are rendered can depend on extent of progress towards completion (e.g., brighter colors and/or heavier lines for vertices/edges in more mature matches).

In some example implementations, in the geo-spatial view, to make the graphic less crowded, the visualization tool can render a subset of the vertices and edges of the data graph. For example, vertices of a data graph that are mapped to "key" (critical actor) vertices of a query graph can be shown in the geo-spatial view. The key (critical actor) vertex of a query graph can be defined as part of a template, set through an API, or otherwise set. For example, the key vertex of a query graph representing a DDoS attack can be the vertex that is the source of messages. Or, as another example, the key vertex of a query graph representing a Botnet attack can be the vertex that has the role of "bot master."

The visualization tool can be distributed between multiple nodes in a distributed architecture. For example, the visualization tool can run as an application in a Web browser environment. Results can be sent to a Web server for rendering, and the Web server can provide the match graphic and progress graphic for rendering in the Web browser environment.

FIG. 16 shows features of a user interface (1600) of an example results visualization tool. The user interface (1600) shows a match graphic (1610) and a progress graphic (1620). The match graphic (1610) is centered around a selected vertex (1612) of the data graph. The selected vertex (1612) is rendered in a different color than other, non-selected vertices in the match graphic (1610). Information associated with the selected vertex (in FIG. 16, a count (1) of complete matches and a match score (11)) is rendered next to the selected vertex (1612). If the user selects a different vertex, the match graphic (1610) can be re-centered around the newly selected vertex, with the newly selected vertex rendered in a different way and information associated with the newly selected vertex presented.

In FIG. 16, with the zoom in/out slider (1650), the view has been set to show a small neighborhood around the selected vertex (1612). (This helps show details for individual matches. When zoomed out more, the match graphic (1610) can depict hundreds, or even thousands of vertices, with tens of thousands or even millions of edges, and a large number of matches.) In FIG. 16, the match graphic (1610) depicts some of the vertices of a data graph, some of the edges of the data graph, one complete match (1614), and two partial matches (1616). For the sake of illustration, the complete match (1614) is shown in the heaviest lines, the partial matches (1616) are shown in narrower lines, and other vertices/edges (not involved in any matches) are shown in the narrowest lines. In some example implementations, vertices/edges are rendered in different colors depending on extent of progress towards completion (e.g., with vertices/edges in complete matches being rendered in a brightest or "hottest" color, vertices/edges in partial matches being rendered in a less bright or "cooler" color, and other vertices/edges being rendered in a least bright or "coolest" color).

The progress graphic (1620) includes a vertex for each of the vertices of the SJ tree. The vertices of the progress graphic (1620) are connected by edges that indicate parent/child relationships and sibling relationships in the SJ tree. The size of a vertex in the SJ tree corresponds to a count of matches found for the associated query subgraph (for a non-root vertex) or query graph (for the root vertex). The heaviness of the lines corresponds to degree of selectivity for the associated query subgraph. In some example implementations, the color of vertices/edges in the progress graphic (1620) corresponds to degree of selectivity for the associated query subgraph.

The visualization tool can update the match graphic (1610) and progress graphic (1620) as it receives new information about matches for the query graph and its query subgraphs. Graphical features of the match graphic (1610) and progress graphic (1620) can be synchronized (e.g., such that colors are the same for corresponding elements in the match graphic (1610) and progress graphic (1620)).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising multiple nodes, each of the multiple nodes including multiple processing cores and memory addressed according to a global address space, wherein the multiple nodes, collectively, are configured to perform operations comprising:
    receiving, as part of one or more streams of updates, information that indicates additions to a data graph, the data graph including vertices and edges between the vertices;
    performing a continuous query process to identify complete matches, if any, of a query graph within the data graph, the continuous query process using multithreading with tasks executable in parallel on at least some of the multiple processing cores of the multiple nodes, wherein the continuous query process includes:
        updating the data graph based on the additions to the data graph, thereby adding new edges to the edges of the data graph;
        searching for new sets of partial matches of query subgraphs of the query graph at the new edges of the data graph; and
        conditionally performing, based at least in part on evaluation of a condition, join operations between partial matches from the new sets of partial matches and partial matches from cumulative sets of partial matches, wherein the condition is whether affected vertices of the data graph for the partial matches from the cumulative sets of partial matches have been updated within a time window defined by a join threshold, including filtering the cumulative sets of partial matches to remove those of the partial matches from the cumulative sets of partial matches having affected vertices not updated within the time window defined by the join threshold; and
    outputting results of the continuous query process.

2. The computer system of claim 1, wherein the continuous query process further includes pruning the data graph to remove one or more of the edges of the data graph and/or one or more of the vertices of the data graph.

3. The computer system of claim 2, wherein the continuous query process further includes:
    determining which of the edges of the data graph are outside a time window defined by a pruning threshold, wherein the pruning removes any of the edges of the data graph that are outside the time window defined by the pruning threshold; and
    determining which of the vertices of the data graph are attached to none of the edges of the data graph, wherein the pruning removes any of the vertices of the data graph that are attached to none of the edges of the data graph.

4. The computer system of claim 1, wherein, for the updating the data graph, different instances of the tasks are executable in parallel for different batches of the additions to the data graph.

5. The computer system of claim 1, wherein the updating the data graph includes, at one of the at least some of the multiple processing cores:
    for a given new edge, among the new edges of the data graph, to be added to a given vertex of the vertices of the data graph, using an atomic transaction to increment a counter that indicates a size of an adjacency list for the given vertex;
    checking whether the counter has reached a size threshold;
    obtaining a lock to gain exclusive access to the adjacency list for the given vertex;
    if the counter has reached the size threshold, increasing size of the adjacency list for the given vertex;
    adding the given new edge to the adjacency list for the given vertex; and
    releasing the lock.

6. The computer system of claim 1, wherein, for the searching for the new sets of partial matches, different instances of the tasks are executable in parallel for different edges of the new edges of the data graph.

7. The computer system of claim 1, wherein the searching for the new sets of partial matches includes searching, at the new edges of the data graph, for partial matches of each unique query subgraph among the query subgraphs of the query graph.

8. The computer system of claim 1, wherein, as part of a lazy searching process:
    the searching for the new sets of partial matches includes searching, at the new edges of the data graph, for partial matches of only a top-selectivity query subgraph and any other query subgraph, among the query subgraphs of the query graph, that furthers progress of a previous partial match towards completion; and
    if a partial match is found, the continuous query process further includes searching, at neighboring edges of the data graph, for any of the query subgraphs that furthers progress of the partial match of the top-selectivity query subgraph towards completion.

9. The computer system of claim 1, wherein the affected vertices for a given partial match, from one of the cumulative sets of partial matches, are all vertices of the given partial match or a subset of vertices of the given partial match.

10. The computer system of claim 1, wherein, for at least one of the query subgraphs, an associated set among the new sets of partial matches is empty.

11. The computer system of claim 1, wherein a subgraph join tree includes one or more internal vertices and multiple leaf vertices, each of the multiple leaf vertices having an old set of partial matches for one of the query subgraphs, and wherein the continuous query process further includes:
    for each given leaf vertex of the multiple leaf vertices of the subgraph join tree, adding an associated set among the new sets of partial matches to the old set of partial matches for the leaf vertex to produce an associated set among the cumulative sets of partial matches;

wherein, for a given internal vertex of the one or more internal vertices of the subgraph join tree, join operations are conditionally performed between partial matches from one of the new sets of partial matches for a first child vertex and partial matches from one of the cumulative sets of partial matches for a second child vertex.

12. The computer system of claim 1, wherein the conditionally performing the join operations includes, for a given one of the new sets of partial matches and a corresponding one of the cumulative sets of partial matches:
mapping at least some of the given new set of partial matches and at least some of the corresponding cumulative set of partial matches to a sequence of key-value pairs;
aggregating the key-value pairs to produce groups of the key-value pairs organized by key; and
reducing the respective groups of key-value pairs.

13. The computer system of 12, wherein:
for the mapping, different instances of the tasks are executable in parallel for different partial matches of the given new set of partial matches and the corresponding cumulative set of partial matches; and/or
for the reducing, different instances of the tasks are executable in parallel for different groups among the groups of the key-value pairs.

14. The computer system of claim 12, wherein the condition is evaluated before the mapping, during the mapping, or during the reducing.

15. The computer system of claim 1, wherein the information that indicates the additions to the data graph is received, as part of the one or more streams of updates, from:
one or more network traffic monitors, wherein the query graph represent a target pattern of intrusion or attack in a computer network, the vertices of the data graph represent network entities selected from the group consisting of machines, services, and applications, and the edges of the data graph represent communications between the network entities;
one or more event monitors, wherein the query graph represents a target pattern of relationships in a social media network, the vertices of the data graph represent social media entities selected from the group consisting of users, services, and items, and the edges of the data graph represent relationships between the social media entities; or
one or more link monitors, wherein the query graph represents a target pattern of links in a set of documents, the vertices of the data graph represent the respective documents, and the edges of the data graph represent links between the documents.

16. The computer system of claim 1, wherein the results of the continuous query process include:
the complete matches, if any, of the query graph within the data graph; and/or
the new sets of partial matches.

17. One or more non-transitory computer-readable media having stored thereon computer-executable instructions for causing a distributed computer system, when programmed thereby, to perform operations, the distributed computer system comprising multiple nodes, each of the multiple nodes including multiple processing cores and memory addressed according to a global address space, the operations comprising:
receiving, as part of one or more streams of updates, information that indicates additions to a data graph, the data graph including vertices and edges between the vertices;
performing a continuous query process to identify complete matches, if any, of a query graph within the data graph, the continuous query process using multithreading with tasks executable in parallel on at least some of the multiple processing cores of the multiple nodes, wherein the continuous query process includes:
updating the data graph based on the additions to the data graph, thereby adding new edges to the edges of the data graph;
conditionally searching, based at least in part on evaluation of a condition, for new sets of partial matches of query subgraphs of the query graph at the new edges of the data graph, wherein the conditionally searching uses vertex-level summary metadata for at least some of the vertices of the data graph to eliminate from consideration partial matches that include at least some of the vertices of the data graph, the vertex-level summary metadata being stored in the memory addressed according to the global address space and including indicators of temporal activity at vertices of the data graph, indicators of range of relations at vertices of the data graph, and/or indicators of updates at vertices of the data graph within a time window defined by a search threshold; and
conditionally performing join operations between partial matches from the new sets of partial matches and partial matches from cumulative sets of partial matches; and
outputting results of the continuous query process.

18. The one or more computer-readable media of claim 17, wherein, for the updating the data graph, different instances of the tasks are executable in parallel for different batches of the additions to the data graph.

19. The one or more computer-readable media of claim 17, wherein, for the conditionally searching for the new sets of partial matches, different instances of the tasks are executable in parallel for different edges of the new edges of the data graph.

20. The one or more computer-readable media of claim 17, wherein the conditionally searching for the new sets of partial matches includes conditionally searching, at the new edges of the data graph, for partial matches of each unique query subgraph among the query subgraphs of the query graph.

21. The one or more computer-readable media of claim 17, wherein, as part of a lazy searching process:
the searching for the new sets of partial matches includes searching, at the new edges of the data graph, for partial matches of only a top-selectivity query subgraph and any other query subgraph, among the query subgraphs of the query graph, that furthers progress of a previous partial match towards completion; and
if a partial match is found, the continuous query process further includes searching, at neighboring edges of the data graph, for any of the query subgraphs that furthers progress of the partial match of the top-selectivity query subgraph towards completion.

22. The one or more computer-readable media of claim 17, wherein, for a given one of the new edges of the data graph, the conditionally searching depends on whether corresponding ones of the indicators of temporal activity indicate at least a threshold level of activity at vertices connected to the given new edge.

23. The one or more computer-readable media of claim 17, wherein, for a given one of the new edges of the data graph, the conditionally searching depends on whether corresponding ones of the indicators of range of relations indicate at least a threshold range of relations for vertices connected to the given new edge.

24. The one or more computer-readable media of claim 17, wherein, for a given one of the new edges of the data graph, the conditionally searching depends on whether corresponding ones of the indicators of updates within the time window defined by the search threshold indicate activity within the time window at vertices connected to the given new edge.

25. The one or more computer-readable media of claim 17, wherein the conditionally performing the join operations is also based at least in part on evaluation of the condition that depends on the vertex-level summary metadata or a different condition.

26. In a computer system that implements a query graph building tool for use in execution of continuous subgraph matching queries on graph-structured data, a method comprising:
receiving first user input that indicates a selection, from a library of multiple available templates, of a template for a query graph, the query graph including vertices, attributes of the vertices, edges between the vertices, and attributes of the edges, wherein the multiple available templates represent different patterns for computer network intrusions, different patterns for other computer network attacks, different social media filters, or different patterns of links in a set of documents;
in response to the first user input, loading the template for the query graph and rendering for display graphical indications of the vertices of the query graph, the attributes of the vertices of the query graph, the edges between the vertices of the query graph, and the attributes of the edges of the query graph;
receiving second user input that indicates one or more changes to the query graph;
changing the query graph based on the second user input;
generating query subgraphs organized as a subgraph join tree for the query graph;
saving the query graph, including the query subgraphs organized as the subgraph join tree;
presenting, on a display screen, results of searching for the query graph within a data graph;
receiving third user input that indicates one or more new changes to the query graph; and
in response to the third user input, changing the query graph.

27. The method of claim 26, wherein the changing includes:
adding one or more new vertices to the vertices of the query graph;
removing one or more of the vertices of the query graph;
adding one or more new edges to the edges of the query graph;
removing one or more of the edges of the query graph;
changing one or more of the attributes of the vertices of the query graph; and/or
changing one or more of the attributes of the edges of the query graph.

28. The method of claim 26, wherein a given one of the attributes of the vertices of the query graph can have a wildcard value or a specific value, and a given one of the attributes of the edges of the query graph can have a wildcard value or a specific value.

29. The method of claim 26, wherein the results indicate complete matches, if any, of the query graph as well as partial matches of one or more of the query subgraphs.

30. The method of claim 26, further comprising:
receiving fourth user input that specifies which of the query subgraphs is to be searched first during a continuous query process; and
saving, in association with the subgraph join tree, an indication of which of the query subgraphs is to be searched first during the continuous query process.

31. The method of claim 30, further comprising:
receiving fifth user input that changes which of the query subgraphs is to be searched first during the continuous query process; and
based on the fifth user input, adjusting the indication of which of the query subgraphs is to be searched first during the continuous query process.

32. The method of claim 26, wherein:
the query graph represents a target pattern of intrusion or attack in a computer network, the vertices of the query graph represent network entities selected from the group consisting of machines, services, and applications, and the edges of a data graph represent communications between the network entities;
the query graph represents a target pattern of relationships in a social media network, the vertices of the query graph represent social media entities selected from the group consisting of users, services, and items, and the edges of the query graph represent relationships between the social media entities; or
the query graph represents a target pattern of links in a set of documents, the vertices of the query graph represent the respective documents, and the edges of the query graph represent links between the documents.

33. One or more non-transitory computer-readable media having stored thereon computer-executable instructions for causing a computer system, when programmed thereby, to perform operations comprising, during execution of continuous subgraph matching queries on graph-structured data:
receiving information that indicates complete matches, if any, of a query graph within a data graph, the data graph including vertices and edges between the vertices, wherein the query graph includes query subgraphs;
receiving information that indicates partial matches of the query subgraphs within the data graph;
rendering for display a match graphic that depicts at least some of the vertices of the data graph, at least some of the edges of the data graph, the complete matches, if any, and the partial matches, wherein, for the partial matches, the rendering depends on extent of progress towards completion;
rendering for display a progress graphic that depicts vertices of a subgraph join tree for the query graph, wherein size of the progress graphic depends on counts of matches for the vertices of the subgraph join tree within the data graph;
presenting, on a display screen, the match graphic; and
presenting, on the display screen, the progress graphic in conjunction with the match graphic.

34. The one or more computer-readable media of claim 33, wherein, for the partial matches, color in the match graphic depends on the extent of progress towards completion.

35. The one or more computer-readable media of claim 33, wherein, for the partial matches, the rendering the match graphic also depends at least in part on selectivity of associated query subgraph.

36. The one or more computer-readable media of claim 33, wherein the operations further comprise repeating, as the data graph changes, the receiving information that indicates complete matches, the receiving information that indicates partial matches, the rendering the match graphic, and the presenting the match graphic.

37. The one or more computer-readable media of claim 33, wherein the match graphic is selectively composited over a geo-spatial map view in which the vertices of the data graph are depicted at different physical locations.

* * * * *